United States Patent
Kishimoto et al.

(10) Patent No.: US 8,331,075 B2
(45) Date of Patent: Dec. 11, 2012

(54) ELECTRO-STATIC FLOATING TYPE GYRO DEVICE

(75) Inventors: Masao Kishimoto, Funabashi (JP);
Masakatsu Matsumoto, Yokohama (JP);
Takayoshi Yamaguchi, Yaita (JP)

(73) Assignee: Tokimec Inc., Tokyo (JP)

( * ) Notice: Subject to any disclaimer, the term of this patent is extended or adjusted under 35 U.S.C. 154(b) by 1143 days.

(21) Appl. No.: 11/711,899

(22) Filed: Feb. 28, 2007

(65) Prior Publication Data

US 2007/0204706 A1    Sep. 6, 2007

(30) Foreign Application Priority Data

Mar. 1, 2006 (JP) .................. 2006-054734

(51) Int. Cl.
*H01G 7/02* (2006.01)

(52) U.S. Cl. ...... 361/233; 361/144; 74/5.6 D; 73/514.15

(58) Field of Classification Search .................... 361/144
See application file for complete search history.

(56) References Cited

U.S. PATENT DOCUMENTS

| | | | | |
|---|---|---|---|---|
| 3,619,014 A | * | 11/1971 | Quick ........................ | 310/90.5 |
| 3,697,143 A | * | 10/1972 | Klinchuch .................. | 310/90.5 |
| 4,061,043 A | * | 12/1977 | Stiles ........................ | 74/5.6 D |
| 4,654,582 A | * | 3/1987 | Ito ............................. | 324/73.1 |
| 5,698,783 A | * | 12/1997 | Murakoshi et al. ........ | 73/504.03 |
| 5,719,335 A | * | 2/1998 | Nakaishi et al. ........... | 73/514.18 |
| 5,763,780 A | | 6/1998 | Matthews et al. | |
| 5,781,985 A | * | 7/1998 | Nakaishi et al. ........... | 29/602.1 |
| 5,920,983 A | * | 7/1999 | Murakoshi et al. ........ | 29/825 |
| 6,330,406 B1 | * | 12/2001 | Yamaguchi ................ | 399/58 |
| 6,657,359 B1 | * | 12/2003 | Hoen et al. ................. | 310/309 |
| 6,668,648 B2 | | 12/2003 | Karasawa et al. | |
| 2003/0121328 A1 | | 7/2003 | Karasawa et al. | |

FOREIGN PATENT DOCUMENTS

| | | |
|---|---|---|
| EP | 1 275 934 A1 | 1/2003 |
| JP | 08-320231 | 12/1996 |
| JP | 10-260056 | 9/1998 |
| JP | 2001-235329 | 8/2001 |
| JP | 2001-513885 | 9/2001 |
| JP | 2004-191296 | 7/2004 |
| JP | 2005-140708 | 6/2005 |
| JP | 2005-214948 | 8/2005 |
| JP | 2006-292577 | 10/2006 |
| WO | WO 98/37380 | 8/1998 |

* cited by examiner

*Primary Examiner* — Rexford Barnie
*Assistant Examiner* — Terrence Willoughby
(74) *Attorney, Agent, or Firm* — Nixon Peabody LLP; Jeffrey L. Costellia

(57) ABSTRACT

The present invention provides an electro-static floating type gyro device comprising: a gyro mechanism having a gyro rotor and plural adjacent pairs of electro static support electrodes for supporting said gyro rotor; a posture control circuit for generating complementary posture control voltages for controlling a posture of the gyro rotor, wherein the complementary posture control voltages applied to the adjacent pairs of electro static support electrodes are alternated in time.

19 Claims, 12 Drawing Sheets

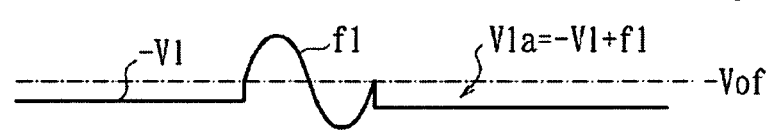

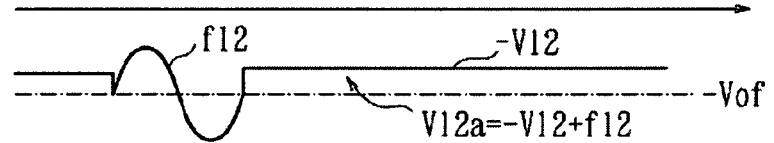

ELECTRO-STATIC FLOATING TYPE GYRO DEVICE

CROSS REFERENCE TO RELATED APPLICATION

This application is based upon and claims the benefit of priority from the prior Japanese Patent Application No. 2006-54734, the entire contents of which are incorporated herein by reference.

FIELD OF THE INVENTION

The present invention relates to an electro-static floating type gyro device including a gyro mechanism unit and an electronic circuit unit. The gyro mechanism unit includes a small gyro rotor and a gyro case, manufactured using micro-machine technology. The gyro rotor is floated and maintained within the gyro case by electro-static supporting force. The gyro rotor is placed in a vacuum for a proper operation. The electronic circuit unit is connected to electrodes of the gyro mechanism unit, detects a relative displacement between the gyro rotor and the gyro case, and performs a posture control and a rotational drive of the gyro rotor. Particularly, the present invention relates to an application method of the posture control voltage applied to adjacent pairs of electro-static support electrodes.

BACKGROUND OF THE INVENTION

Description of the Related Art

Some electro-static floating type gyro devices performing acceleration detection for multiple directions are known (for example, see Japanese Patent Laid Open No. H08-320231, Japanese Patent Laid Open No. 2001-235329, Japanese Patent Laid Open No. 2004-191296, Japanese Patent Laid Open No. 2005-140708, Japanese Patent Laid Open No. 2005-214948, Japanese Patent Laid Open No. 2006-292577). Those gyro devices have a conductive rotating unit, an electrically insulative fixed unit with electrodes formed on the surface facing the conductive rotating unit, and electronics circuit unit for detecting the relative displacement between the fixed unit and the rotating unit and for calculating the measures such as acceleration. In the electro-static floating gyro devices, the gyro rotor which is the rotating unit is of a disk shape (Japanese Patent Laid Open No. H08-320231), or is of a ring shape (Japanese Patent Laid Open No. 2001-235329, Japanese Patent Laid Open No. 2004-191296, Japanese Patent Laid. Open No. 2005-140708, Japanese Patent Laid Open No. 2005-214948), and movably encapsulated in a vacuum space of the gyro case which is the fixed unit. The gyro case is made of electrically insulating material. A multiple electro-static support electrodes are arranged and distributed to be formed on the inner surface of the case facing the rotor. Rotor drive electrodes for rotating the rotor and displacement detection electrodes for detecting the relative displacement are also formed on the inner surface of the case. The gyro mechanism unit is formed with such gyro rotor and such gyro case.

The electronic circuit unit detects the relative displacement of the gyro rotor from the gyro case, and applies control voltages to the electro-static support electrodes to cause an electro-static force which counter-acts the displacement for controlling the position. The measurement, such as acceleration, is calculated based on the detection result of the relative displacement. With respect to the detection methods of the relative displacement, there are some methods in which the displacement detection signal is flowed to detection electrodes from electro-static support electrodes (Japanese Patent Laid Open No. H08-320231, Japanese Patent Laid Open No. 2001-235329, and Japanese Patent Laid Open No. 2005-214948), some methods in which the displacement detection signal is reversely flowed to electro-static support electrode from detection electrodes (Japanese Patent Laid Open No. 2004-191296, Japanese Patent Laid Open No. 2005-140708) or other methods in which frequency discrimination is used (Japanese Patent Laid Open No. H08-320231 and Japanese Patent Laid Open No. 2001-235329), in which current is detected (Japanese Patent Laid Open No. 2004-191296), in which synchronous voltage is detected (Japanese Patent Laid Open No. 2005-140708) and in which time division is utilized (Japanese Patent Laid Open No. 2005-214948).

Among these, a detailed example useful for the description of the present invention is shown in the FIGS. 1A to 2B. These figure show an electro-static floating type gyro device with a ring shaped rotor, the examples. The position controlling circuit is mainly configured with a digital processor. The signal for detecting the displacement is flowed from the support electrodes to the detection electrodes. FIG. 1A is a cross sectional view of the gyro mechanism. FIGS. 1B to 1D are perspective views showing electrode arrangements in the gyro mechanism unit. FIG. 1B shows a perspective view looking down from the upper side. FIG. 1C and FIG. 1D show perspective views looking up from the lower side. FIG. 2A shows a block diagram of the electronic circuit unit. FIG. 2B shows an example of the signal waveform. While the electro-static support electrodes and the displacement detection electrodes are shown in the figures, however, the rotor drive electrodes for driving the rotor are omitted to avoid complexity.

The gyro mechanism unit has the ring rotor 10 and the gyro case 20 (see FIG. 1A). The ring shaped gyro rotor 10 is stored in the gyro case 20 to be electro-statically floated and to be capable to rotate. The gyro case 20 is a case, in which an upper side plate member 21, a lower side plate member 22 and a spacer 23, all of them being made of insulator such as glass, are combined. A vacuum space of a ring shape is formed inside the gyro case 20. The gyro rotor 10 is made of a conductor such as silicon, and formed in a ring shape so that the gyro rotor rotates stably in one spin axis direction. A plurality of electrodes 31 to 36, 41 to 46, 38 and 48 made of metal film patterns or of heavily implanted silicon layer or of the like are formed in the inner surface of the gyro case 20 in order to render the electro-static force to the gyro rotor 10 from the gyro case. These electrodes 31 to 36, 41 to 46, 38 and 48 are so arranged that the predetermined relationship of facing distance with the gyro rotor 10, a pitch and so on should be fulfilled.

The details of these electrodes 31 to 36, 41 to 46, 38 and 48 will be described in detail. These are divided into a plurality of pairs and the two pairs sandwich the gyro rotor 10. The electro-static support electrodes 31 to 36 and 41 to 46 for rendering electro-static attraction for controlling posture are divided into pairs of adjacently arranged electrodes. As shown in the figure, for example, the electro-static support electrodes 36a and 36b are in adjacent to each other in the upper side plate member 21, thereby making an adjacent pair 36a/36b. The electro-static support electrodes 46a and 46b are in adjacent to each other in the lower side plate member 22, thereby making an adjacent pair 46a/46b. The adjacent pair 36a/36b and the adjacent pair 46a/46b make opposed pairs facing each other. With respect to the spacer 23, the electro-static support electrodes 31a and 31b make an adjacent pair 31a/31b, and the electro-static support electrodes 41a and 41b also make an adjacent pair 41a/41b. The adjacent pair 31a/31b and the adjacent pair 41a/41b make an opposed pair facing each other. Similar relationships are applied to the other electrodes 32 to 35, 42 to 45. Further in the present invention, the reference numerals such as 31a, 31b are used when individual electrodes are distinguished explicitly, and references such as 31 to 36, 41 to 46 are used when those electro-static support electrodes are not distinguished explicitly.

In order to describe the detailed functions of these electro-static support electrodes 31 to 36, 41 to 46, three axes being perpendicular to each other are called Axis X, Axis Y and Axis Z, respectively. In FIG. 1A, the Axis X is placed in the right-to-left direction of the paper, the Axis Y is placed in a direction running through the paper, and the Axis Z is placed in the top-to-bottom direction of the paper. The rotation along with the Axis X is called ϕ, and the rotation along with the Axis Y is called θ. Then, the electro-static support electrodes 31, 41 formed in the spacer 23 of the gyro case 20 and arranged in the Axis X are applied with posture control voltages, which generates a force along the X direction corresponding to the posture control voltages. The electro-static capacitance between the electrodes and the gyro rotor 10 is changed according to the X direction displacement of the gyro rotor 10. In the gyro case 20, the electro-static support electrodes 32, 42 formed in the spacer 23 and arranged in the Axis Y direction exhibit the same function as for the Y direction. In the gyro case 20, the electro-static support electrodes 34, 44, 36 and 46 formed in the upper side plate member 21 or in the lower side plate member 22 and arranged in the Axis Y direction exhibit the similar function as for the direction of ±Z±ϕ. In the gyro case 20, the electro-static support electrodes 33, 42, 35, 45 which are formed in the upper side plate member 21 or in the lower side plate member 22 and arranged in the Axis X direction exhibit the similar function as for ±Z±θ direction. Further described in more detail, for example, the adjacent pair 36a/36b relates to the +Z+ϕ direction and the adjacent pair 46a/46b relates to the −Z−ϕ direction.

The electronic circuit unit 50 (See FIG. 2A for reference) and the gyro mechanism unit 10/20 configure an electro-static floating type gyro with, by connecting the electro-static support electrodes 31 to 36, 41 to 46, and the displacement detection electrodes 38, 48 of such gyro case 20. The plurality of signals available for discriminating frequency are used in the displacement detection signals, which are superimposed on each of the posture control voltages applied to the electro-static support electrodes 31 to 36, 41 to 46. The displacement detection signals are detected by the displacement detection signal detection circuit 51 by signals at the displacement detection electrodes 38, 48. The posture control circuit 53 includes a digital processor 53b, which may be a digital signal processor or a microprocessor. In the input, where an output of the 51 is input, an A/D converter circuit 53a (analog-digital converter circuit) is provided. In the output, where a control amount corresponding to the posture control voltages is output, a D/A converter circuit 53c (digital-analog converter circuit) is provided. The relative displacement of the gyro rotor 10 and the gyro case 20 is calculated from the detection value of the displacement detection signal. The acceleration A is calculated from the relative displacement. The acceleration A is a typical example of the measured value calculated by the electro-static floating type gyro device, and the measured value may also be a velocity and a position.

The posture control circuit 53 is configured to calculate the control amount for cancelling out the change for each of the electro-static support electrodes 31 to 36, 41 to 46, based on the detection result of the relative displacement. When the control amount is sent to a control output circuit 54 through the D/A converter circuit 53c, the posture control voltages are applied to the electro-static support electrodes 31 to 36, 41 to 46 by the control output circuit 54. Thereby, the electro-static force occurs between the portion of the gyro case 20 where the electro-static support electrodes 31 to 36, 41 to 46 are formed and the opposing part of the gyro rotor 10, and consequently the relative displacement between the gyro rotor 10 and the gyro case 20 is maintained constantly. Such generation of the posture control voltages and calculation of the acceleration A from the gyro output is performed for the 5 directions X, Y, Z, θ, ϕ (See FIG. 1 of Japanese Patent Laid Open No. H08-320231, FIG. 9 of Japanese Patent Laid Open No. 2001-235329 and FIG. 9 of Japanese Patent Laid Open No. 2004-191296 for reference). This calculation is made by, firstly, the displacements in each of the directions are calculated from the displacement detection signal (for example, see ΔX, ΔY, ΔZ, Δθ, Δϕ in FIG. 7 of Japanese Patent Laid Open No. H08-320231), then the PID operation and the like is performed to calculate a necessary floating force (for example, see fX, fY, fZ, fθ, fϕ of FIG. 7 in Japanese Patent Laid Open No. H08-320231).

The posture control voltages are generated by distributing these calculated floating forces to the electro-static support electrodes 31 to 36, 41 to 46 corresponding to the arrangement and the capacity thereof (for example, see ±V1A to ±V4A in FIG. 7 of Japanese Patent Laid Open No. H08-320231). The acceleration for the gyro output is calculated by converting these floating forces into the external force acceleration corresponding to the mass of the gyro rotor 10 (for example, see αX, αY, αZ, d/dt, dϕ/dt in FIG. 7 of Japanese Patent Laid Open No. H08-320231). Such effective elements of the control voltage for controlling posture are approximately equal to or less than tens of kHz to move the gyro rotor 10. On the other hand, the displacement detection signal to measure the relative displacement without affecting the movement of the gyro rotor 10 has much higher frequency than the above. For example for the displacement detection signal is of an order of MHz. The displacement detection signal generation circuit 25, for example, is assigned with 5 frequencies superimposed on the posture control voltages at the input of a control output circuit 54.

The posture control circuit 53 generates complementary voltages with different positive and negative voltages as for the voltages applied to an opposed pair of the support electrodes and an adjacent pair of the support electrodes. As for a specific example, an application of the posture control voltages to the opposing pair 31/41 of the adjacent pairs 31a/31b and 41a/41b (See FIG. 2A for reference) will be described specifically by referring to the waveform example (See FIG. 2B for reference). Supposing that the gyro rotor 10 is staying in a neutral position, regardless of Axis Z-based rotation, the constant offset voltage applied to the electro-static support electrodes 31 to 36, 41 to 46 is Vof, and the posture control voltages in the direction of ±Z±θ which is calculated for controlling posture is Vx, the main component of the voltage V1a at the electrode 31a is −V of −Vx, the main component of voltage V1b at the electrode 3lbis +V of +Vx, the main component of voltage V12a at the electrode 41a is −Vof+Vx, and the main component of voltage V12b at the electrodes 41b is −V of −Vx.

These application voltages come under influence of the superimposed displacement detection signal of high frequency. However, if the high frequency inphase superimposed components are ignored, the application voltages V1a and V1b at the adjacent pair 31a/31b are complementary voltages with waveforms having positive and negative ones, and the application voltages V12a and V12b at the adjacent pair 41a/41b are complementary voltages with waveforms having positive and negative ones. However, such complementary posture control voltages are applied when the operation power is supplied to the electronic circuit unit 50 and the electronic circuit unit 50 is normally operating. When the supply of the operation power to the electronic circuit unit 50 is terminated and the electronic circuit unit 50 is no longer operating, the voltage V1a at the electrostatic support electrodes 31 to 36, 41 to 46 will be at 0V.

In the conventional electrostatic floating type gyro device described above, electro-static support control voltages and displacement detection signal are applied in time divisional fashion or superimposition to the electro-static support electrodes corresponding to each axis. The relative displacement between the gyro case and the gyro rotor is calculated based on the displacement detection signal. The force applied to the gyro rotor is calculated by the displacement, and thus the gyro device operates. However, either of such conventional floating type gyro devices generate complementary voltages with different positive and negative voltages as posture control voltages and apply them to the adjacent electrodes (an adjacent pair) among the electro-static support electrodes, which led the inventor the concept that the measurement accuracy deterioration. That is to say, as a result of a longtime experiment and a longtime observation, a distribution situation of the ions existing inside of the gyro case provided with the insulator changes while it changes slowly. It becomes clear that the remarkable effect is given in the measurement accuracy.

FIG. 3 is a partially enlarged schematic diagram of the gyro mechanism unit along with longitudinal section for describing such a problem. FIG. 3A shows an ion distribution right after starting of a posture control operation. FIG. 3B shows an ion distribution after a continued posture control operation. Ions are shown with "+" and "−". However, before applying the electrical field, the ions are almost equally distributed inside the gyro case 20. Since the gyro case 20 is insulator, the equal distribution is maintained at least for a while (See FIG. 3A for reference) even though the posture control voltages are applied to the electrodes 31 to 36, 41 to 46. In this situation, an electro-static attraction is made between the electro-static support electrodes 31 to 36, 41 to 46 and the gyro rotor 10 as expected at the design. However, if the electro-static floating type gyro device operates for long time, such as several or tens of hours, the ions inside the insulator move in the insulator, specifically (See FIG. 3B for reference), "+" ions are unevenly distributed for example at side of the electrode 36a, where a negative control voltage (−Vof−Vx) is applied, and "−" ions are unevenly distributed at an adjacent side of the electrode 36b, where a positive control voltage (+Vof+Vx) is applied. By the electric fields by the unevenly distributed ions, the electric field for the gyro rotor 10 is changed.

Thereby, the electric field for the gyro rotor 10 is partly cancelled (See the dotted line parts of FIG. 3B for reference.), whereby the electric attraction is lost in part. Thus, the designed electro-static attraction is not generated between the gyro case 20 and the gyro rotor 10, and lack of electro-static attraction brings not only a performance deterioration of the posture control but also a destabilization of acceleration measurement. Therefore, as a result, it causes deterioration of the measurement accuracy as an electro-static floating type gyro device. In addition, if the supply to a sense circuit is removed and the operation is suspended after the ions inside the insulator is unevenly distributed by a longtime operation, the ions inside the insulator is then distributed, which results in a destabilization at the next operation is revived. Now, it will become a basic problem to deal with the movement of the ion inside the insulator gyro case 20 in order to make the destabilization factor of the measurement accuracy to be removed and then an improvement of the measurement accuracy to be attempted.

To solve such problem, an electro-static floating type gyro device is proposed, in which a bias circuit generating complementary and constant bias voltages with positive and negative ones are provided in a place to receive power at the time of the suspension of power supply to the posture control circuit. At the same time, a converter circuit is provided for every electro-static support electrodes. The bias voltage instead of posture control voltages are applied to the adjacent pair of the electro-static support electrodes at the time of suspending the supply to the posture control circuit (Japanese Patent Laid Open No. 2006-292577). By applying the complementary and constant bias voltages to an adjacent pair also after suspending the operation of the posture control circuit and the ions inside the gyro case is maldistribute actively in the vicinity of the electro-static support electrodes, whereby the movement of ions is suppressed, the ion distribution state is stabilized, and thus the measurement accuracy may be maintained well for a long time.

In fact, as a test experiment and analysis are preceded, further technical problem has appeared. That is, in a case, where electric charge particles charged by some kind of reasons are placed to a part other than electrodes, that is, an electrically insulative part in the inner surface of the gyro case (See "+" in FIG. 3C for reference), discrepancy is generated in the measurement output of the electro-static floating type gyro device by a gentle changes of the amount of electric charge, as well as deterioration of measurement accuracy by an ion change inside the gyro case. In this case, where the electric charge particles are bonded to the gyro rotor, the electric charge is charged to the gyro rotor, by which discrepancy occurs in a measurement output. In addition, although the method described above helps a movement restraint of ions, it can not solve the measurement discrepancy at the time of generating difference in the area in an adjacent pair of the electro-static support electrodes due to an undesired unevenness.

To describe this point, it is so supposed that the offset voltage is Vof, the control voltage component for controlling posture is V, one of the electrodes in an adjacent pair has an area of S1 and the application voltage of +Vof+V, the other electrode has an area of S2 and the application voltage of −Vof−V, the potential of gyro rotor is Vr; the distance between the gyro rotor and the gyro case is x, and the dielectric constant is $\epsilon_0$. Then, the electro-static attraction F acting to the gyro rotor from the adjacent pair is calculated by:

$$F = (1/2)(\epsilon_o S1/x^2)(+Vof+V-Vr)^2 + (1/2)(\epsilon_o S2/x^2)(+Vof+V+Vr)^2.$$

This is differentiated with V, to obtain:

$$[dF/dV = (\epsilon_o S1/x^2)(+Vof+V-Vr) + (\epsilon_o S2/x^2)(+Vof+V+Vr)].$$

According to the expression, if there is no area difference in the adjacent pair, that is, if it is in an ideal state of S1=S2, the dF/dV does not depend on Vr. However, if there is an area difference in the adjacent pair, that is, if it is in a state of S1≠S2, dF/dV depends on Vr. In addition, the acceleration is calculated from the change in F and from the change in V in the electro-static floating type gyro device. Therefore, if Vr is related to dF/dV, it results in a discrepancy in the calculated acceleration. Now, it will become a further problem in the measurement discrepancy caused by the area difference of the adjacent pair of the support electrodes are reduced and thus improvement of the measurement accuracy is attempted, by getting rid of a dependency between Vr and dF/dV.

It is also conceived to add a new and another circuit for solving the further problem described above as well as a bias circuit and a converter circuit for solving a basic problem described above. However, in such a direct approach, circuit scale is increased so that it will not only be against a request for miniaturization but also an undesired increase in cost will be caused. Now, it is required that a method for solving the above-described basic problem and the further problem at the same time be formulated.

That is to say, it will be a technical problem to reduce the measurement discrepancy by the area difference of the adjacent pair of the support electrodes as well as to suppress the ion movement inside the electrically insulative gyro case and stabilize the ion distribution state, whereby an improvement of measurement accuracy will be attempted. Also, the target for not only suppressing ion movement inside the gyro case, but also adhesion of the electric charge particles into the inner surface of the gyro case may be suppressed, will be a still further technical problem.

SUMMARY OF THE INVENTION

In order to solve the above technical problem, one aspect of the present invention provides an electro-static floating type gyro device comprising: a gyro mechanism having a gyro rotor and plural adjacent pairs of support electrodes for supporting said gyro rotor; a posture control circuit for generating complementary posture control voltages for controlling a posture of the gyro rotor, wherein the complementary posture control voltages applied to the adjacent pairs of support electrodes are alternated in time.

In order to solve the above technical problem, one aspect of the present invention provides an electro-static floating type gyro device comprising: a gyro rotor; a gyro case storing the gyro rotor, the gyro case having plural adjacent pairs of support electrodes for supporting said gyro rotor and plural displacement detection electrodes between the gyro rotor and the gyro case, the support electrodes and the detection electrodes being arranged on inside surfaces of the gyro case; a signal detection circuit for detecting a relative displacement of the gyro rotor and the gyro case through the detection electrodes and for generating a displacement detection signal; and a posture control circuit for generating complementary posture control voltages for controlling a posture of the gyro rotor based on the displacement detection signal and for applying the complementary posture control voltages to the adjacent pairs of support electrodes; wherein the complementary posture control voltages applied to the adjacent pairs of support electrodes are alternated in time.

In such electro-static floating type gyro device of the present invention, posture control voltages are complementary voltage with positive and negative voltages, and are applied to an adjacent pair to the electro-static support electrodes. The pair of electrodes are adjacent to each other and on the application of the voltages, permutation and alternation of the complementary voltage are performed. If the complementary voltage is permutated and altered, a positive-and-negative electric charge changes alternately in the adjacent pair, therefore, the movement direction of the ions inside the insulator of the gyro case is canceled. As movement velocity of the ions is slow, the movement state of the ions becomes a slow slightly vibrating state when the permutation of the complementary voltage is repeated, and thus the ions almost lose their influence as a change factor of the electric field of the support electrodes. Therefore, an improvement of measurement accuracy may be attempted by suppressing the ion movement inside the electric insulative gyro case and stabilizing the ion distribution state. Thus, the above-described basic problem is solved.

The problem on the measurement discrepancy by an area difference of the adjacent pair of the electro-static support electrodes is also solved. That is to say, as for the complementary posture control voltages, it is supposed that the offset voltage is Vof, the control voltage component for controlling posture is V, one electrode of the adjacent pair have an area S1, the other electrode of the adjacent pair have an area S2, a potential of the gyro rotor is Vr, a distance between the gyro rotor and the gyro case is x and a dielectric constant is ∈o. Further in the present invention, a positive application voltage +Vof+V and a negative voltage −Vof−V are applied in turn to the adjacent pair. Therefore, assuming the ratio is half and half, the electro-static attraction operating in the gyro rotor is calculated by:

$$F = (1/4)\{(\in_o S1 + \in_o S2)/x^2\}(+Vof+V-Vr)^2 + (1/4)\{(\in_o S1 + \in_o S2)/x^2\}(+Vof+V+Vr)^2.$$

This is differentiated with V, to obtain:

$$[dF/dV = (\in_o S1/x^2)(+Vof+V) + (\in_o S2/x^2)(+Vof+V)].$$

According to the expression, dF/dV does not depend on Vr even though there is an area difference in the adjacent pair. Thus, dependency between Vr and dF/dV disappears, discrepancy does not occur in the calculated acceleration even if there is a change in F and in V, and even if there is any discrepancy in the adjacent pair. Thereby, the measurement discrepancy by the area difference of the adjacent pair of the electro-static support electrodes is reduced and an improvement of the measurement accuracy may be made. Thus the further problem described above is solved at the same time. Therefore, according to the present invention, the ion movement in the inner surface of insulator of the gyro case is suppressed and the ion distribution condition is stabilized. At the same time, the measurement discrepancy by the area difference of the adjacent pair of the electro-static support electrodes is also reduced so that the improvement of the measurement accuracy is achieved.

In addition, in the electro-static floating type gyro device of the present invention, there are many distributed adjacent pairs of the support electrodes. Not only the alternation of the complementary voltage is performed when the complementary posture control voltages is applied, but also the positive and negative ones are applied to other support electrodes. For the electrodes making no adjacent pair, there are timings when the positive and negative are applied to adjacent electrodes. The electric charge particles adhered between the two corresponding electrodes in the inner surface of the gyro case are shaken strongly by the rapid change in the peripheral electric field. Therefore, many of the electric charge particles release electric charges attracted to any of the electrodes to become harmless particles.

As described above, if the alternation of the complementary voltage is performed at the time of the application of the posture control voltages for the adjacent pair of the electro-static support electrodes, a tendency is seen, in which finer particles stuck in the inner space of the gyro case are electrically charged and then become electric charge particles. Further, the electric charge particles existing or being generated in between the electrodes of the adjacent pair are spilled by the alternating electric field, and adhered to other parts of the inner surface of the gyro case. This causes deterioration in the measurement accuracy, or in some cases, the particles are adhered to the gyro rotor. On the contrary, in the present invention, the operation of the alternation of the complementary voltage is expanded to electrodes other than the adjacent pair from the adjacent pair. The electric charge particles of the inner surface of the gyro case are rapidly reduced; thereby reducing the deterioration of the secondary problem accompanied with the alternation of the complementary voltage. Therefore, according to the present invention, an adherence of the electric charge particles to the inner surface of the gyro case may be suppressed.

Further, in the electro-static floating type gyro device of the present invention, frequency dividing may be used. In the electro-static floating type gyro device of the present invention, a pseudo random noise code may be used.

BRIEF DESCRIPTION OF THE DRAWINGS

FIG. 1A is a cross sectional view of the gyro mechanism unit. FIGS. 1B to 1D are perspective diagrams, in which electrode positions in the gyro mechanism unit are shown. FIGS. 1C and 1D are diagrams looking up from the lower side.

FIG. 3A shows an ion distribution right after starting of a posture control operation. FIG. 3B shows an ion distribution after a continuation of the posture control operation. FIG. 3C shows an adherence state of electric charge particles.

FIG. 4A is a block diagram of the electronic circuit unit. FIGS. 4B to 4D are signal waveform examples.

FIG. 5A is a substantial part block diagram of the electronic circuit unit. FIGS. 5B to 5D are signal waveform examples.

FIG. 6A shows a substantial part block diagram of the electronic circuit unit. FIGS. 6B, 6C and 6D show examples of signal waveforms.

FIG. 7A shows a whole circuit diagram including a control circuit and a signal detection circuit.

FIG. 7B shows a displacement detection signal occurrence circuit. FIG. 7C shows a current detection circuit.

FIGS. 10A to 10C show a structure of the electronic circuit unit of the electro-static floating type gyro device according to the Embodiment 2 of the present invention, in which FIG. 10A is a whole circuit diagram including a control circuit and a signal detection circuit; FIG. 10B is an inner block diagram if the control unit and the signal detection circuit; FIG. 7C is a current detection circuit.

DETAILED DESCRIPTION OF THE INVENTION

The detail of the embodiments to practice the electro-static floating type gyro device of the present invention will be described in the following Embodiments 1 to 3 and. Examples 1 and 2. The Embodiment 1 shown in FIG. 4 is one embodiment of the above-described invention. The Embodiment 2 shown in FIG. 5 is other embodiment of the above-described invention. The Embodiment 3 shown in FIG. 6 is still other embodiment of the above-described invention. The Example 1 shown in FIGS. 7 to 9 is an example incorporating the present invention to the gyro device described in Japanese Patent Laid Open No. 2004-191296. The Example 2 shown in FIGS. 10 to 12 is an example incorporating the present invention to the gyro device described in Japanese Patent Laid Open No. 2005-214948). Identical codes are referred and shown in the same components. Therefore, duplications in explanations are omitted and the descriptions are made mainly focusing on differences from the conventional ones.
Embodiment 1

Figure 4A:
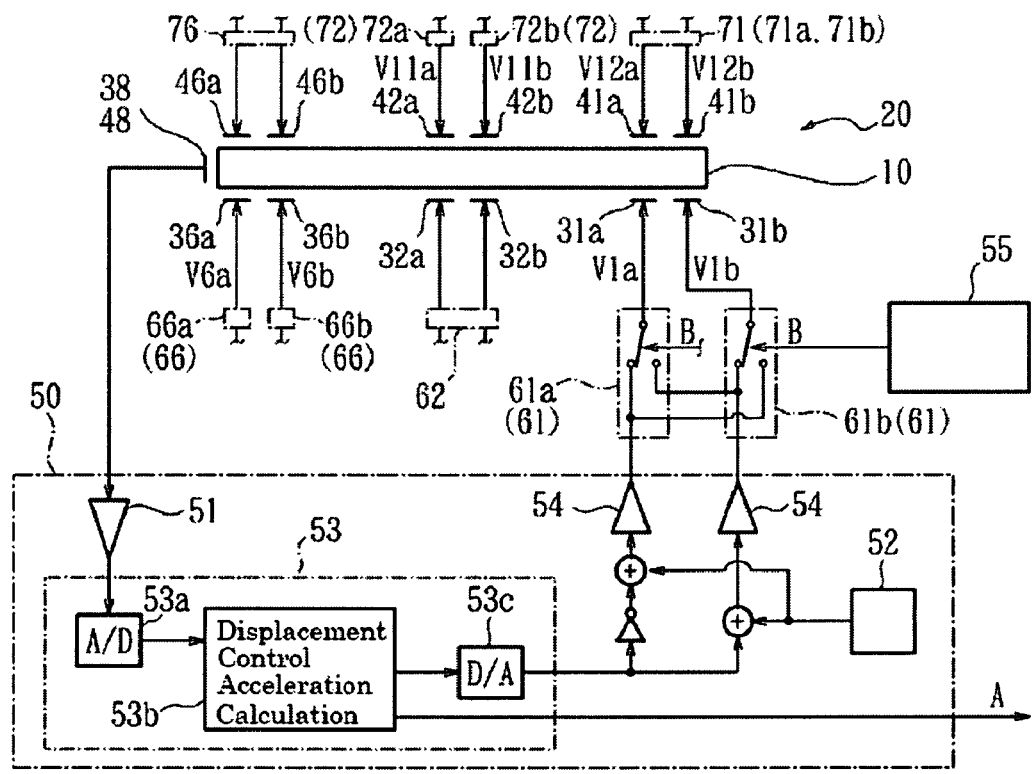
FIGS. 4A to 4D show the Embodiment 1 of the electro-static floating type gyro device of the present invention.
Figure 4B:
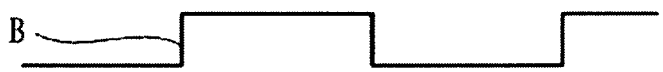
Figure 4C:
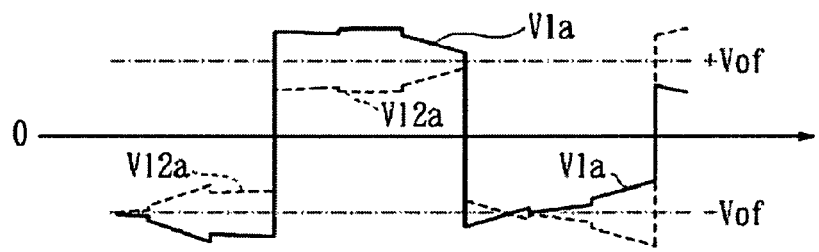
Figure 4D:
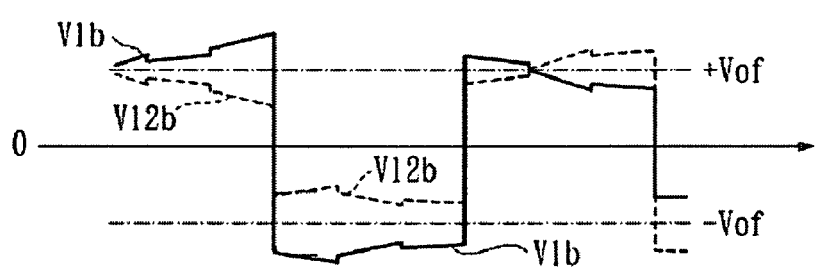

The configuration of the Embodiment 1 of the electro-static floating type gyro device according to the present invention will be described by referring to the figures. FIG. 4A shows a block diagram of an electronic circuit unit, and FIGS. 4B, 4C and 4D are signal waveform examples.

Figure 1A:
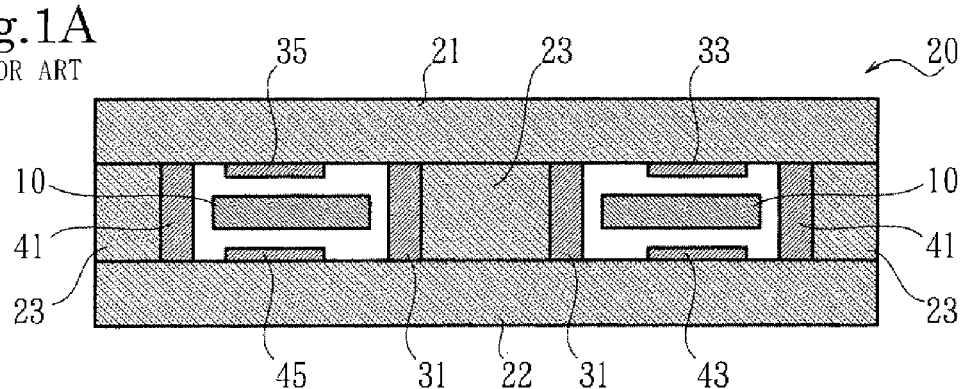
FIGS. 1A to 1D show a conventional electro-static floating type gyro device.
Figure 1B:
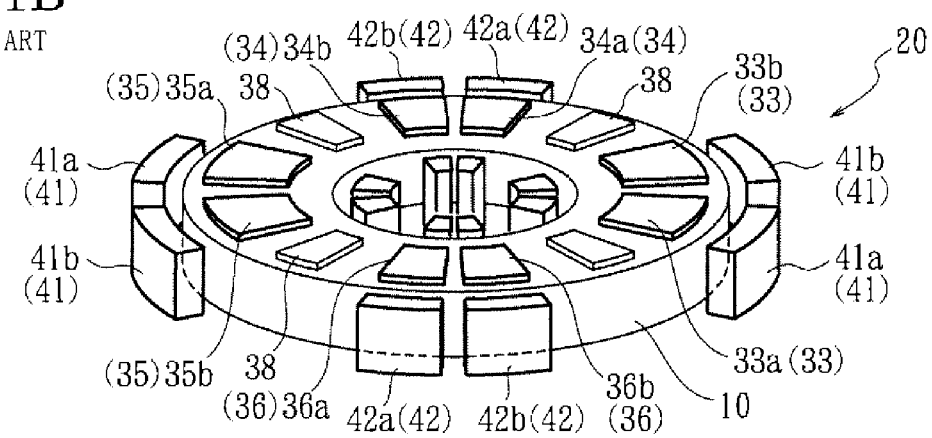
Figure 1C:
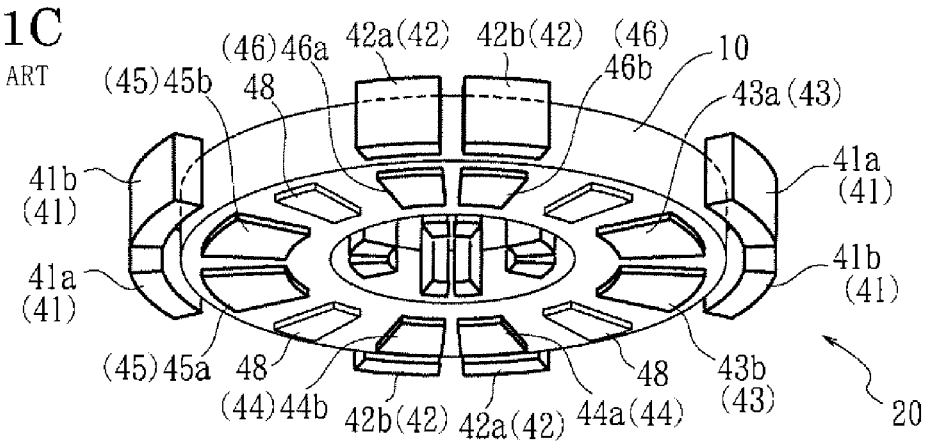
Figure 1D:
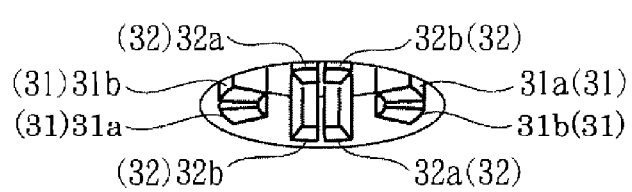
Figure 2A:
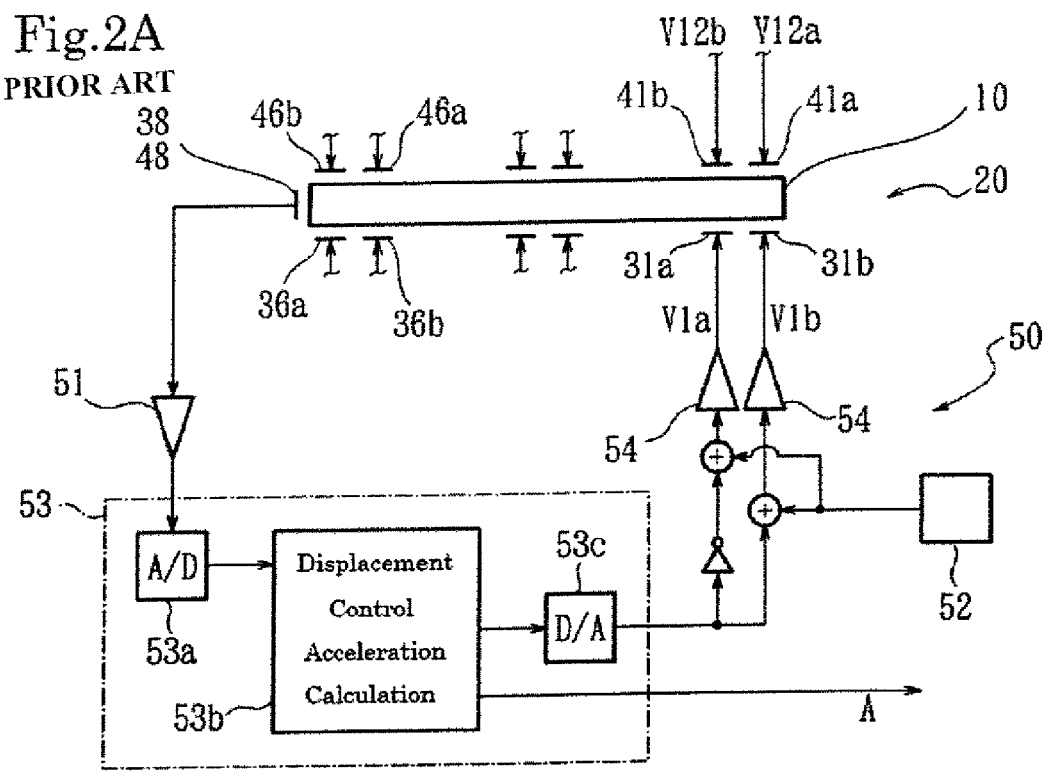
FIG. 2A is a block diagram of an electronic circuit unit.

A gyro mechanism unit 10/20 (See FIG. 1 for reference) and an electronic circuit unit 50 (See FIG. 2A for reference.) are the same as the above described gyro device except modifications such as an insertion of a switching circuit. The difference between the electro-static floating type gyro device and the above-described device is that an inversion control signal generation circuit 55 and switch circuits 61 to 66, 71 to 76, are provided (See FIG. 4A for reference.). The inversion control signal generation circuit 55 (See FIG. 4A for reference.) may be, for example, an oscillator circuit and a waveform shaping circuit. Binary clock signals B are generated and send to the switch circuits 61 to 66, 71 to 76 all at once. The clock signals B, for example, are either "0" value or "1" value, however, the value is inverted in a constant cycle, for example, a several ms cycle.

Switch circuits 61 to 66, 71 to 76 (See FIG. 4A for reference.), are respectively connected to a control voltage transmission line and inserted between the control output circuit 54 of the electronic circuit unit 50 and the support electrodes 31 to 36, 41 to 76 of the gyro case 20. As described in the examples shown in the figure, the switch circuits 61 is inserted in the control voltage transmission lines of the electrodes 31, the switch circuit 62 is inserted in the control voltage transmission lines of the electrodes 32, the switch circuit 66 is inserted in the control voltage transmission lines of the electrodes 36, the switch circuit 71 is inserted in the control voltage transmission lines of the electrodes 41, the switch circuit 72 is inserted to the control voltage transmission lines of the electrodes 42, and the switch circuit 76 is inserted in the control voltage transmission lines of the electrodes 46. Also for the electrodes 33, 34, 35, 43, 44, 45 whose illustrations are omitted, corresponding switch circuits 63, 64, 65, 73, 74, 75 described later are provided respectively.

The switch circuits 61 are set to permutate application voltages V1$a$, V1$b$ applied from the electronic circuit unit 50 to the corresponding electro-static support electrodes 31 depending on the switch control signals B. The electrodes 31 are provided with an adjacent pair 31$a$/31$b$ and the application voltages V1$a$, V1$b$ are complementary posture control voltages, in which the positive and negative ones are complementary. Accordingly, the complementary voltages applied to the adjacent pair 31a/31b from the posture control circuit 53 are switched and permutated (alternated). The switch circuit 61 has, for example, 2 input-output switches of MOS-FET 61a inserted in the control voltage transmission line of the voltage V1a of the electrode 31a, and 2 input-output switches of MOS-FET 61b which is inserted in the control voltage transmission line of the voltage V1b of the electrodes 31b.

The switches 61a, 61b, inputs the complementary voltages which are output by the control output circuit 54 and selectively outputs either one of them. The selection is changed corresponding to a value of the switch control signal B, where the switch 61a and the switch 61b are made to output the permutated application voltages. The switch circuit 71 has the 2 input-output switches 71a, 71b, by which complementary voltages V12a, V12b applied to the adjacent pair 41a/41b from the posture control circuit 53 are made permutated responding to the switch control signals B. The switch circuit 72 has 2 input-output switches 72a, 72b, by which complementary voltages V11a, V11b are applied to the adjacent pair 42a/42b are made permutated responding to the switch control signals B. The switch circuit 66 has 2 input-output switches 66a, 66b, by which complementary voltages V6a, V6b applied to the adjacent pair 36a/36b are made permutated responding to the switch control signals B. Similar configuration is made for the other switch circuits 62, 76, 63, 64, 65, 73, 74, 75.

Figure 2B:
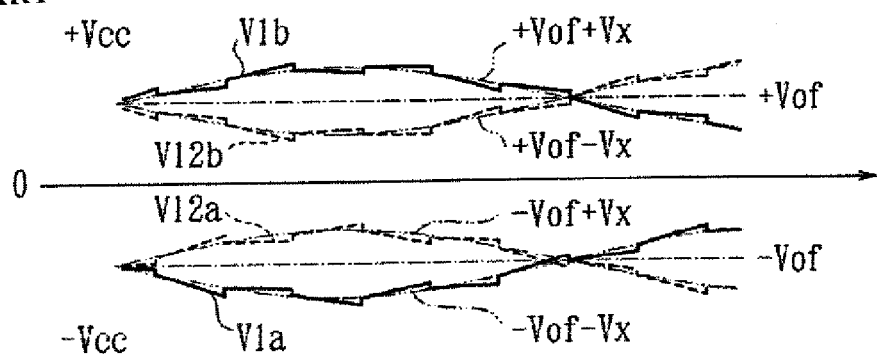
FIG. 2B is a signal waveform example.
Figure 3A:
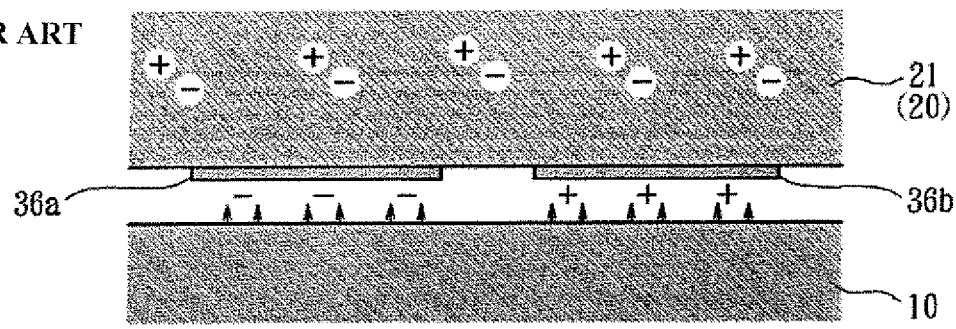
FIGS. 3A to 3C are partially enlarged schematic diagrams of the gyro mechanism unit longitudinal section for describing such a problem.
Figure 3B:
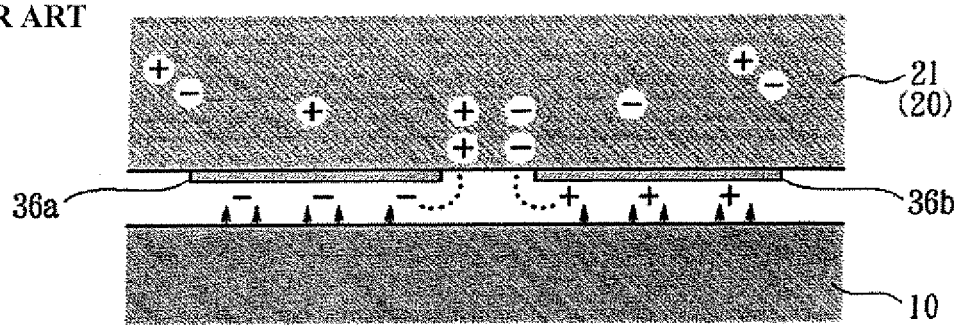
Figure 3C:
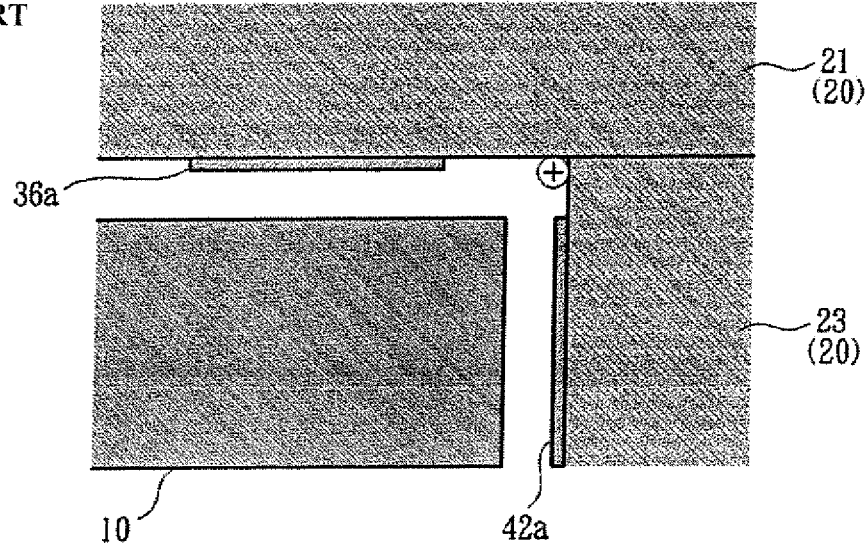

The usages and operations of such electro-static floating type gyro device are almost the same as the conventional ones. The difference from the conventional one is that the operation state according to the permutation of the complementary voltages which are applied to the adjacent pair of the electro-static support electrodes. This difference will be described in detail. The application voltages V1a, V1b to the adjacent pair 31a/31b and the application voltages V12a, V12b to the adjacent pair 41a/41b will be described as a representative examples referring to the figures. For comparison, the content previously mentioned is described again by setting the constant offset voltage to be Vof and the changing control voltage component for controlling posture to be Vx, the main component of the voltage V1a of the electrode 31a was −Vof−Vx and was always negative, the main component of the voltage V1b of the electrode 31b was −Vof+Vx and was always positive, the main component of the voltage V12a of the electrode 41a was −Vof+Vx and was always negative, and the main component of the voltage V12b of the electrode 41b was −Vof−Vx and was always positive, in a conventional device without the switch circuit 61 (See FIG. 2B for reference.).

On the other hand, in the electro-static floating type gyro device of the present invention (See FIG. 4A for reference.), the switch circuits 61, 71 receive the switch control signals B output from the inversion control signal generation circuit 55 and perform the switching and permutation operation and are inserted in the control voltage transmission line of the electrodes 31, 41. The application voltages V1a, V1b, V12a, V12b to the adjacent pairs 31a/31b, 41a/41b are as follows (See FIGS. 4B, 4C and 4D for reference). Firstly, during the operation of the electronic circuit unit 50, a value of the switch control signals B is changed from "0" to "1", or from "1" to "0", in a predetermined frequency (See FIG. 4B for reference).

Then, the application voltages V1a, V1b, V12a, V12b are the same as the conventional one when the switch control signal B is "0". However, the application voltages Via, V1b are permutated and, at the same time, the application voltages V12a, V12b are also permutated when the switch control signals B is "1". To be specific, the main component of the voltage Via of the electrode 31a becomes either a negative −Vof−Vx or a positive +Vof+Vx alternately in a constant period (See FIG. 4C). As well, the main component of the voltage V12a of the electrode 41a becomes either a negative −Vof+Vx or a positive +Vof−Vx alternately in a constant period. Also (See FIG. 4D for reference), the main component of the voltage V1b of the electrode 31b becomes either a positive +Vof+Vx or a negative −Vof−Vx alternately in a constant period, and the main component of the voltage V12b of the electrode 41b becomes either a positive +Vof−Vx or a negative −Vof+Vx alternately in a constant period.

Same things occur in the other adjacent pairs 32a+32b to 36a+36b, 42a+42b to 46a+46b of the electro-static support electrodes however repetitive description is omitted. Thus, the permutation of the complementary voltages is performed on the complementary posture control voltages applied in the entire adjacent pairs, by which movement of the ions in the inner surface of the gyro case 20 is suppressed, and by which, as well, influence, by which the area difference of the adjacent pairs of the electro-static support electrodes gives to a calculation, is solved or reduced. Therefore, measurement accuracy is improved as for the electro-static floating type gyro device.

Embodiment 2

Figure 5A:
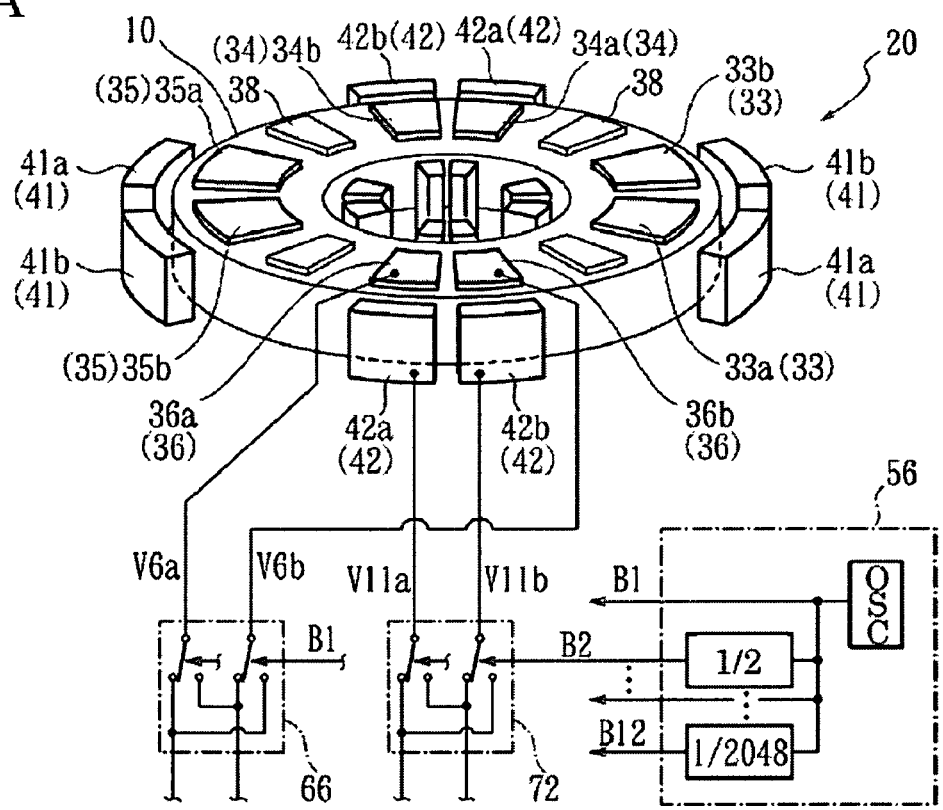
FIGS. 5A to 5D show the Embodiment 2 of the electro-static floating type gyro device of the present invention
Figure 5B:
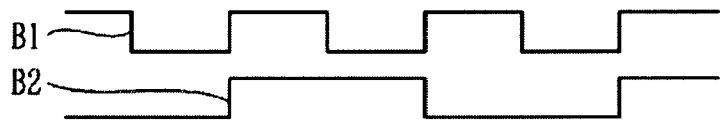
Figure 5C:
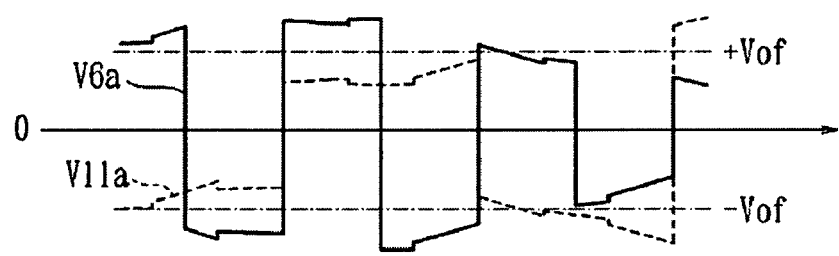
Figure 5D:
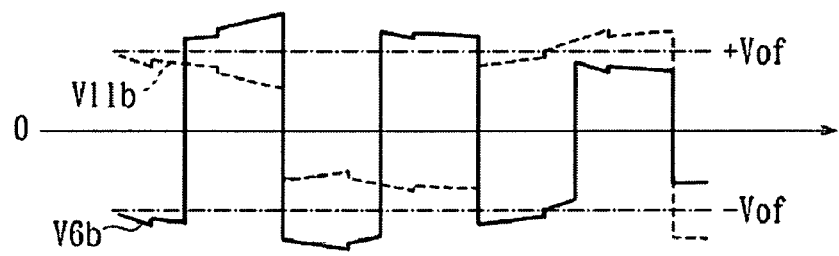

A configuration of the Embodiment 2 of the electro-static floating type gyro device of the present invention will be described by referring to the figures. FIG. 5A shows a main part block diagram of the electronic circuit unit, and FIGS. SB, SC and SD show signal waveform examples.

In this embodiment, an inversion control signal generation circuit 56 using frequency divider circuit is introduced instead of the inversion control signal generation circuit 55 generating the switch control signals B common to the switch circuits 61 to 66, 71 to 76. This is the difference from the above-described Embodiment 1. In the inversion control signal generation circuit 56 (See FIG. 5A for reference), the oscillation circuit generates an oscillation signal with a constant cycle, for example 1 ms cycle. The signal is supplied as switch control signals B1 for a switching operation control, for example, the switch circuit 66. Then the switch control signals B1 is twice frequency divided and become the switch control signals B2, which is supplied to the switching operation control, for example, of the switch circuit 72. In addition, the switch control signals B1 is 4 times, 8 times, 16 times . . . and 2048 times divided so that other switch control signals B12 are generated and distributed to other switching signals 61.

If this case, the polarity inversion control signals B1, B2 and the application voltages V6a, V6b, V11a, V11b as representative examples are described as well as the above-described Embodiment 1 (See FIGS. SB, SC and SD for reference). If a value of the switch control signal B1 changes alternately to "0" and "1" in a constant cycle during the operation of the electronic circuit unit 50, a value of the polarity switch control signal B2 changes alternately "0" and "1" in a cycle twice as prolonged as the cycle (See FIG. 5B for reference). Then (See FIGS. 5C and 5D for reference), when the polarity inversion control signals B1 and B2 are both "0", the application voltages V6a, V6b, V11a, V11b are all the same as the conventional one. However, when the inversion control signal B1 is "1", the application voltages V6a, V6b are permutated, and when the inversion control signal B2 is "1", the application voltages V11a, V11b are permutated.

To be specific, a constant offset voltage is set to be Vof and a control voltage component for controlling posture is set to be Vy, the main component of the voltage V6a of the electrodes 36a alternately becomes a positive +Vof+Vy or a negative −Vod−Vy in a constant cycle. At the same time, the main component of the voltage V11a of the electrodes 42a alternately becomes a negative −Vof+Vy or a positive +Vod−Vy in a cycle as twice as the constant cycle (See FIG. 5C for reference). In addition (See FIG. 5D for reference), the main component of the voltage V6b of the electrodes 36b alternately becomes a positive +Vof+Vy or a negative −Vod−Vy in a constant cycle, and the main component of the voltage V11b of the electrodes 42b alternately becomes a positive +Vof−Vy or a negative −Vod+Vy in a cycle as twice prolonged as the constant cycle.

Almost same things occur in the other adjacent pairs of the electro-static support electrodes 31a/31b to 35a/35b, 41a/41b, 43a/43b to 46a/46b although the repetitive description is omitted. However, the inversion cycles of each of the frequency divided clock signals B3 to B12 are different each other and they are also different from the signals B1, B2, in which, either two signals from the signals B1 to B12, in a certain timing, become "0" and "1" Therefore, also as for any two of the electro-static support electrodes 31 to 36, 41 to 46, the application state of the complementary posture control voltages is divided into either positive or negative. If electric charge particles are adhered inbetween two electrodes in the inner surface of the gyro case 20, the electric charge particles are shaked strongly by a rapid change of the peripheral electric field, and are attracted to any of the electrodes and then becomes harmless particles.

Permutation of the complementary voltage is performed for the control voltages for posture control applied to the entire adjacent pairs. At the same time, an operation of the complementary voltage is expanded to the any two arbitrary electrodes from the adjacent pairs. Therefore, in the electro-static floating type gyro device, measurement accuracy is further improved. In addition, for a dividing to be used in the inversion control signal generation circuit 56, power of two as described above may be used, but also prime numbers 1, 2, 3, 5, 7, 11, . . . , for example, may be used. Integers including these factors may also be used.

Embodiment 3

Figure 6A:
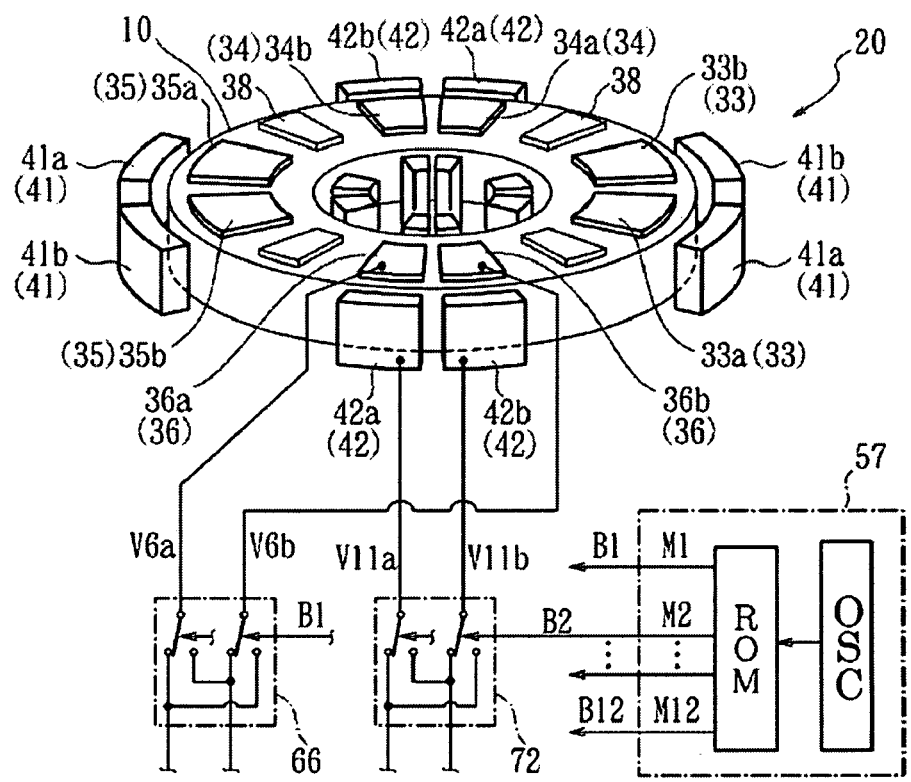
FIGS. 6A to 6D show the Embodiment 3 of the electro-static floating type gyro device of the present invention.
Figure 6B:
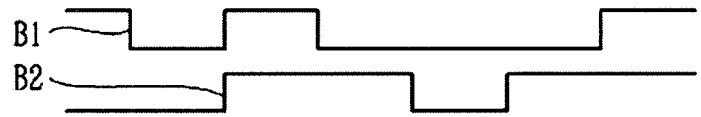
Figure 6C:
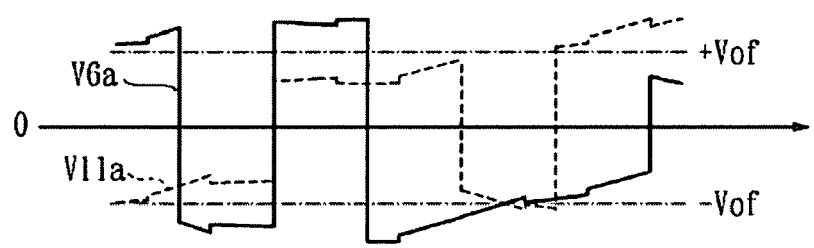
Figure 6D:
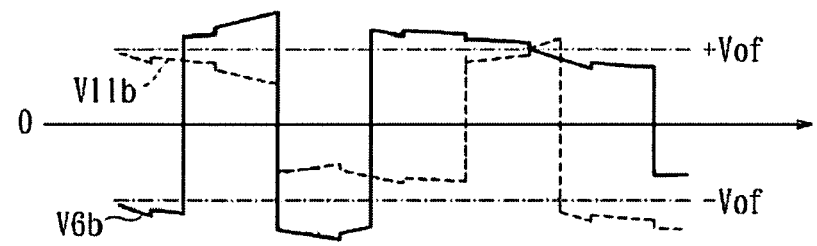

A configuration of the Embodiment 3 of the electro-static floating type gyro device of the present invention will be described by referring to the figures. In FIG. 6A shows a main part block diagram of the electronic circuit unit, and FIGS. 6B, 6C and 6D show waveform examples.

The difference between the above-described Embodiment 2 and this embodiment is that an inversion control signal generation circuit 56 generates the switch control signals B1 to B12 is replaced with an inversion control signal generation circuit 57 which uses a pseudo random noise code. The pseudo random noise code is also called PN sequences (Pseudo Noise sequences) or a PN code (Pseudo Noise code). An M sequences (Maximal-length sequences) and Gold sequence code are often used. Either of them is characterized in that: they are provided with a binary numbers sequence, an addition value over a single round is almost zero, and sum of products of different codes are almost zero.

The inversion control signal generation circuit 57 (See FIG. 6A for reference), for example, has a ROM storing twelve M sequences M1 to M12, in which different sequences are selected. The twelve M sequences are read out sequentially and periodically to generate inversion control signal B1 to B12. Although illustration is omitted, the M sequences may be generated by a small digital circuit with shift registers. In all of above examples, pseudo random noise codes Ml to M12 are supplied sequentially to each of the switch circuits 61 to 66, 71 to 76.

In this case, values of the inversion control signal B1 to B12 switch between "0" and "1" in irregular cycles (See FIG. 6B for reference) in response to the pseudo random noise codes. The appearance rates of "0" and "1" in the inversion control signals B1 to B12 are almost equal. In addition, even if any two of the inversion control signals B1 to B12 are taken, there is a case where the value is "0" and "1". Therefore, also in this case (See FIGS. 6C and 6D for reference), the switch circuit 66 switches in response to "0" and "1" of the inversion control signal B1 to apply the positive and negative ones of the application voltages V6a, V6b to the adjacent pairs 36a/36B, the switch circuit 72 switches in response to "0" and "1" of the inversion control signal B2 to apply the positive and negative ones of the application voltages V11a, V11b to the adjacent pairs 42a/42b. As for the other application voltages of the adjacent pairs, the positive and negative ones are permutated as well.

The appearance ratios between the positive voltage and the negative voltage of any of the electro-static support electrodes 31 to 36, 41 to 46 are almost equal. Moreover, the application states of the control voltages for supporting posture of any two of the electro-static support electrodes 31 to 36, 41 to 46 are divided into positive or negative. Thus, permutation of the complementary voltage is performed although in an irregular cycle as for the complementary posture control voltages applied to the entire adjacent pairs. There fore, the permutation of the complementary voltages are expanded to any two arbitrary electrodes from adjacent pairs. Accordingly, the measurement accuracy of the electro-static floating type gyro device is improved.

EXAMPLE 1

Figure 7A:
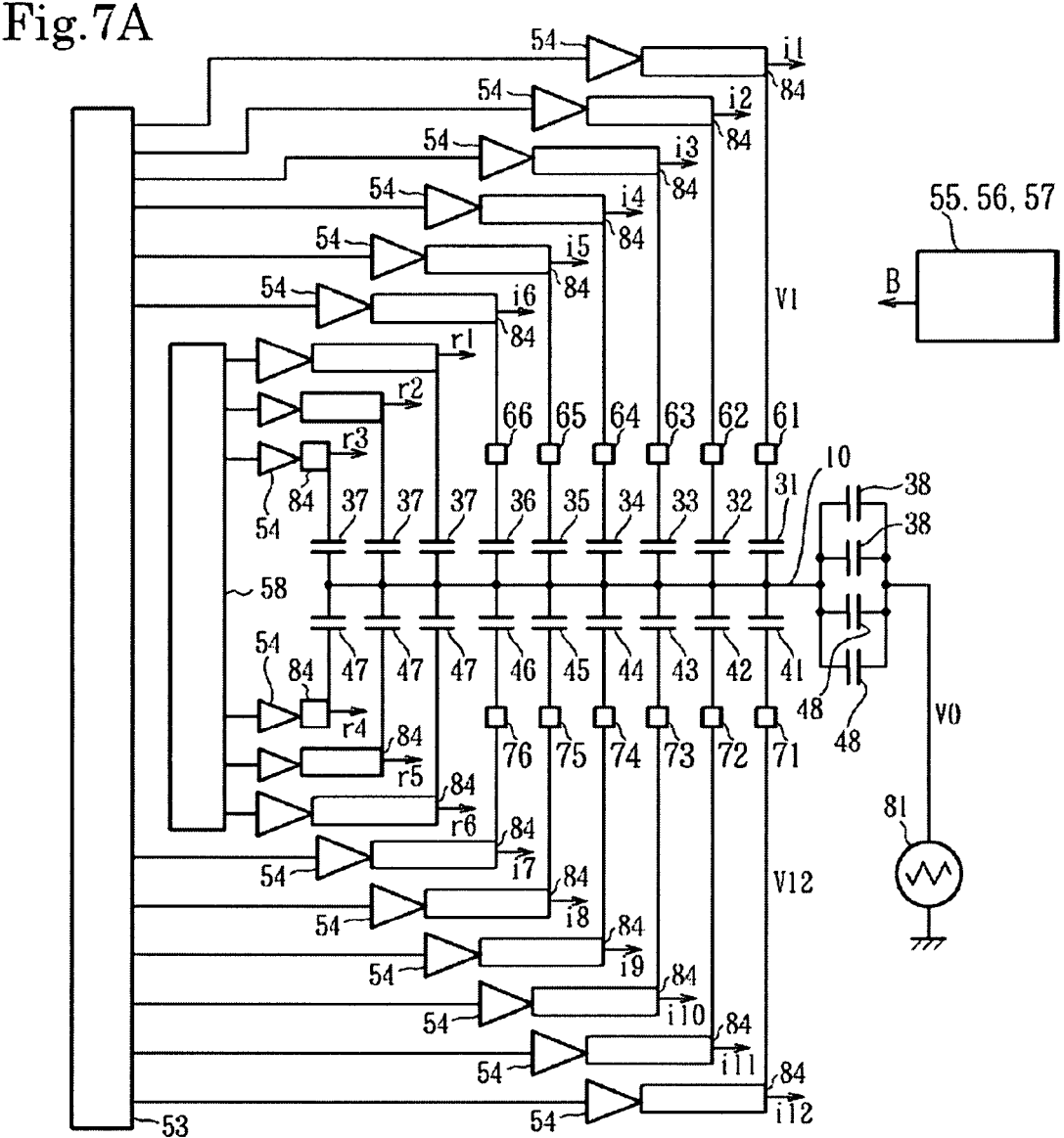
FIGS. 7A to 7C show a structure of the electronic circuit unit of the electro-static floating type gyro device according to the Embodiment 1 of the present invention.
Figure 7B:
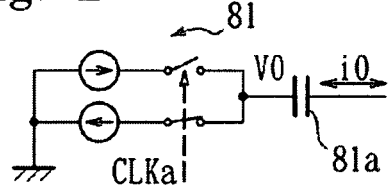
Figure 7C:
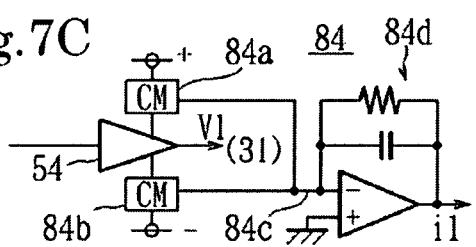
Figure 8A:
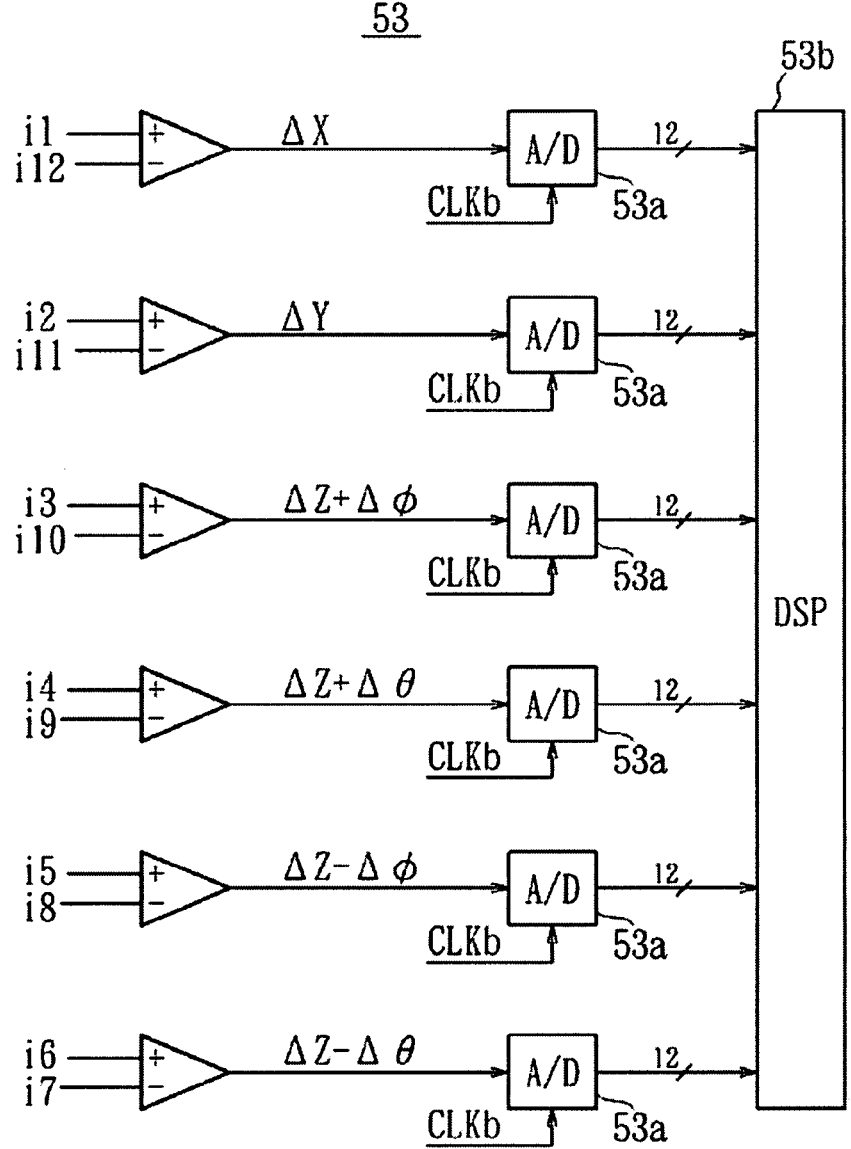
FIGS. 8A is the signal input unit of the posture control circuit.
Figure 8B:
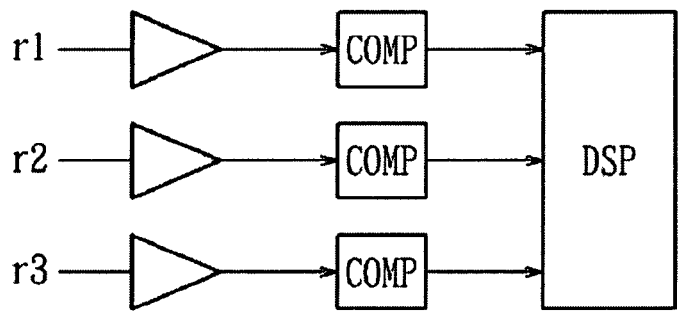
FIG. 8B is the signal input unit of the rotor control circuit.

A detailed configuration of the Example 1 of the electro-static floating type gyro device of the present invention will be described by referring to the figures. FIG. 7 shows a structure of electronic circuit unit. FIG. 7A shows an entire circuit diagram including a control circuit and a signal detection circuit. FIG. 7B shows a displacement detection signal generation circuit. FIG. 7C is an current detection circuit. In addition, FIG. 8A shows a signal input unit of the posture control circuit. FIG. 8B shows a signal input unit of the rotor control circuit.

The present invention may also be applied to a disc-shaped rotor type gyro (Japanese Patent Laid Open No. H08-320231), however, in this Example, a ring shaped rotor type gyro (See Japanese Patent Laid Open No. 2001-235329, Japanese Patent Laid Open No. 2004-191296, Japanese Patent Laid Open No. 2005-140708, Japanese Patent Laid Open No. 2005-214948, Japanese Patent Laid Open No. 2006-292577 for reference.) will be described. Therefore, FIG. 1 according to a gyro mechanism unit 10/20 will also be referred. In addition, in FIG. 1, the electrodes for driving rotor 37 are circularly arranged on the bottom surface of an upper side plate member 21. The displacement detection electrodes 47 are circularly arranged on the upper surface of the lower side plate member 22. Both of the electrodes oppose each others in the top and bottom.

The electro-static floating type gyro device of Example 1 has a gyro mechanism unit 10/20 previously described in BACK GROUND OF THE INVENTION (See FIG. 1 for reference) and an improved electronic circuit unit (See FIG. 7 to FIG. 9 for reference). The electronic circuit unit has a posture control circuit 53 with a constraint control system together with electro-static support electrodes 31 to 36, 41 to 46, a rotor control circuit 58 with a rotor driving system together with electrodes for driving rotor 37, 47, signal detection circuits 81/84 with a displacement detection system together with displacement detection electrodes 38, 48, and complementary voltage permutation circuits 55/61 to 76 in the constraint controlling system for improvement. In addition, a control output circuit 54 may be referred a part of posture control circuit 53 and rotor control circuit 58, illustration is made for every electrode for a simplicity on description.

The signal detection circuit 81/84 (See FIG. 7A for reference) has one displacement detection signal generation circuit 81 and a large number of current detection circuits 84. The method for detecting displacement follows the technology, in which a displacement detection signal is flowed into support electrodes from detection electrodes and in which the current of the displacement detection signal superimposed on the control voltage signal for controlling posture is detected (See Japanese Patent Laid Open No. 2004-191296 for reference). Since a relative displacement between a gyro rotor 10 and a gyro case 20 is calculated as for many points based on a capacity change of the electro-static support electrodes 31 to 36, 41 to 46, the displacement detection signal is pass through not only the displacement detection electrodes 38, 48 but also the electro-static support electrodes 31 to 36, 41 to 46.

The displacement detection signal generation circuit 81 may be a circuit, in which a sine curve signal is generated as a displacement detection signal V0 (a displacement detection signal to be applied) as far as filling a requirement that the frequency is sufficiently high in order not to affected the movement of the gyro rotor 10. The amplitude of the applied signals for detecting displacement V0 may be set arbitrary in a range of being permitted by the power supply voltage (See FIG. 7B for reference). A pair of constant current circuit connected in reverse direction and switches in response to the clock CLKa repeat generations and drainages of current alternately, to generate voltage signals of triangular wave for detecting displacement V0.

The displacement detection signal V0 generated by such constant current circuit pair and the switch circuit is applied through an appropriate coupling capacitors 81a as shown in the figure, or directly not through such capacitors, to the displacement detection electrodes 38, 48. The displacement detection current iO supplied to a parallel connection point of the displacement detection electrodes 38, 48 from the displacement detection signal generation circuit 81 is in square wave, in which the polarization of the constant current is synchronized with the clock CLKa, thus the displacement detection signal V0 becomes a voltage signal of triangle wave. The frequency of the clock CLKa is, for example, equal to or more than 1 MHz. This is much higher than tens of kHz of which is effective frequency of the control voltage and thus the above-described requirement is fulfilled.

The current detection circuit 84 (See FIG. 7A for reference) is connected to each of the twelve units or twelve groups of the control output circuits 54 which sends out the control voltages V1, V12 for controlling posture to the electro-static support electrodes from the posture control circuit 53 and such. The current detection circuit 84 is also connected to each of the control output circuits 54 which sends out the control voltages for driving rotation to the electrode for driving rotor 37 from the rotor control circuit 58. Each of the current detection circuit 84 (See FIG. 7C for reference) is provided with a pair of current mirror 84a, 84b, a differential output line 84c, in which these output lines are made connect to each other, and an amplifier 84d which outputs a displacement detection current i1 and such, performing signal amplification and noise removal.

The input of the current mirror 84a is connected to the high potential (+) electric supply line of the control output circuit 54 (especially to an output circuit). The input of the current mirror 84b is connected to the low potential (−) electric supply line of the control output circuit 54. The both outputs are connected to the differential output line 84c. Therefore, either of the current detection circuits 84 detects the output current of the control output circuit 54 and generates the displacement detection current i1 to i12, r1 to r6 or corresponding current (to-be-detected displacement detection signals).

By the posture control circuit 53 (See FIG. 7A for reference), as previously described, the following posture control is performed. The posture control voltages V1, V12 and such are generated from a relative displacement other than the direction along with Axis Z, between the gyro rotor 10 and the gyro case 20, between the Axis X direction displacement $\Delta X$, the Axis Y direction displacement $\Delta Y$, the Axis Z direction displacement $\Delta Z$, the Axis ($\phi$ direction displacement $\Delta \phi$ and the Axis $\theta$ direction displacement $\Delta \theta$. The relative displacements is set to be zero by applying each of the posture control voltages V1, V12 to the electro-static support electrodes 31 to 36, 41 to 46 of a plurality of the electrodes 31 to 48. Each of the controlling voltages V1, V12 and such are made to amplify toward a required level before the application by the control output circuit 54, in which a positive voltage signal and a negative voltage signal.

The calculation by the posture control circuit 53 basically is not different from previously described one (See FIG. 8A for reference). Six A/D converter circuits 53a provided in the fist stage of the digital processor 53b (DSP) are configured to take a large number of displacement detection signal. Either of the A/D converter circuits example. The clock CLKb is 90° shifted from the clock CLKa, for example. The phase difference may be different from 90° as far as transitional periods are avoided at switching, and the frequency may be multiplied or divided.

The six A/D converter circuits 53a are assigned to different signals. One signal is made by taking a difference between the displacement detection current i1 toward the support electrodes 31 and the displacement detection current i12 toward the support electrodes 41 and by extracting a component of the X direction displacement $\Delta X$. One signal is made by taking a difference between displacement detection current i2 toward the support electrodes 32 and the displacement detection current i11 toward the support electrodes 42 and by extracting a component of the Y direction displacement $\Delta Y$. One signal is made by taking a difference between the displacement detection current i3 toward the plural adjacent pairs of support electrodes 33 and displacement detection current i10 toward the support electrodes 43 and by extracting a component of the Z+$\phi$ direction displacement $\Delta Z + \Delta \phi$. One signal is made by taking a difference between displacement detection current i4 toward the support electrodes 34 and the displacement detection current i9 toward the support electrodes 44 and by extracting a component of the Z+$\theta$ direction displacement $\Delta Z + \Delta \phi$. One signal is made by taking a difference between displacement detection current i5 toward the support electrodes 35 and the displacement detection current i8 toward the support electrodes 45 and by extracting a component of the Z−$\phi$ direction displacement $\Delta Z - \Delta \phi$. One signal is made by taking a difference between displacement detection current i6 toward the support electrodes 36 and displacement detection current i7 toward the support electrodes 46 and by extracting a component of the Z–ϕ direction displacement ΔZ–Δθ.

The rotor control circuit 58 (See FIG. 7A for reference) performs a well-known calculation from a rotation state along the Axis Z of the gyro rotor 10, generates a control voltage for driving rotation, for example, triple phase pulse-shaped signals and performs the rotation control, in which the gyro rotor 10 is made to rotate in a constant velocity by applying the pulse-shaped signals to the electrode for driving rotor 37, 47. The rotation state of the gyro rotor 10 is detected from the capacity change of the electrodes for driving rotor 37, 47. These control voltages are also set to be amplified toward a required level before the application, by the control output circuit 54 or a similar output circuit.

Such rotor control circuit 58 (See FIG. 8B for reference) is made by digital circuit by adopting DSP (Digital Signal Processor). Therefore, a quantization method is provided in the previous stage. The quantization method may be the same as the A/D converter circuit 53a, however, it is sufficient for accomplishing a rotor rotation control to be able to catch equal to or more than one phase of the displacement detection current r1 to r6. Therefore, comparators COMP which is simpler and easier than the A/D converter circuit 53a are used for each of the displacement detection current r1 to r6 in the example. Each of the binarized displacement detection signals are offered to the well-known calculation, in which a control voltage for driving rotation such as triple-phase pulse shaped signal is generated based on the rotation state along the Axis Z of the gyro rotor 10, after the input to the DSP, by a processing of sampling program of the DSP at any time.

The complementary voltage permutation circuits 55/61 to 76 are provided with either one of inversion control signal generation circuit of the inversion control signal generation circuit s 55, 56, 57 described in the Embodiments 1 to 3 and switch circuits 61 to 66, 71 to 76 common to the Embodiments 1 to 3. As described above, the switch circuits 61 to 66, 71 to 76 are provided to correspond to the adjacent pairs of the electro-static support electrodes 31 to 36, 41 to 46 so that the complementary voltages are permutated for the corresponding adjacent pairs. The inversion control signal generation circuits 55, 56, 57 render the switch circuits 61 to 66, 71 to 76 to perform the permutation operations by generating binary inversion control signals B1 to B12 and providing them to the switch circuits 61 to 66, 71 to 76.

Figure 9A:
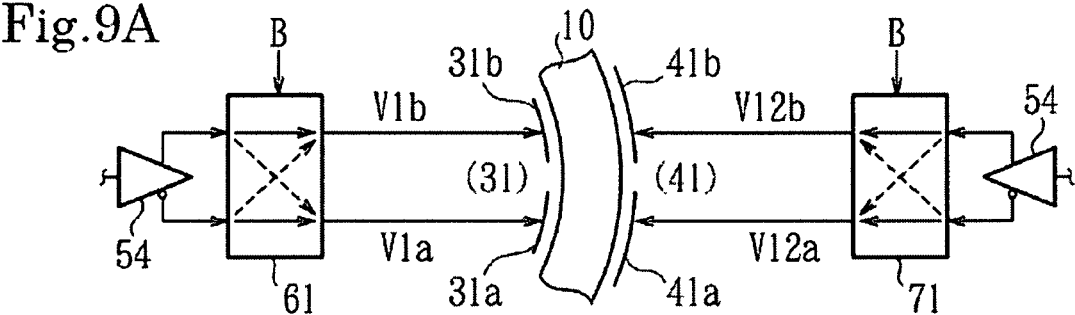
FIG. 9A is a detailed connection diagram of the control output circuit.
Figure 9B:
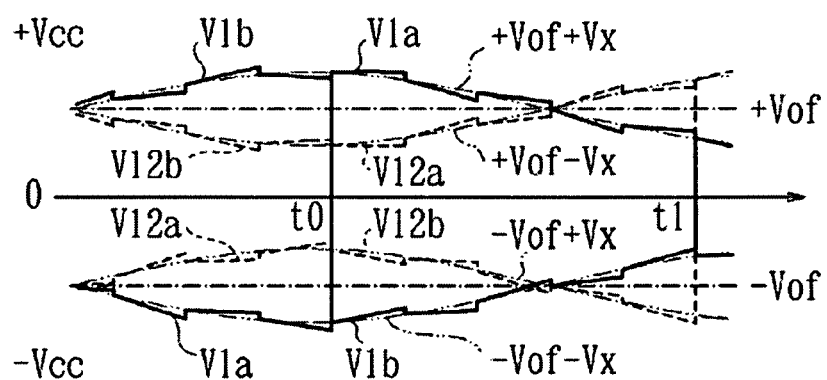
FIGS. 9B to 9F are signal waveform examples.
Figure 9C:
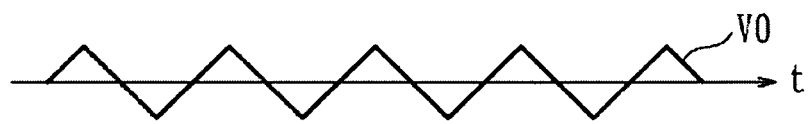
Figure 9D:
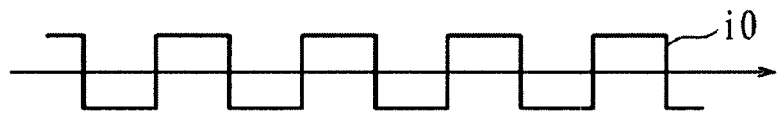
Figure 9E:
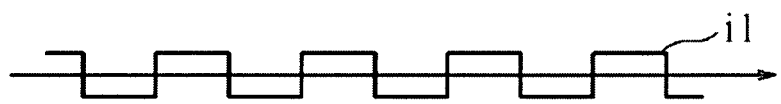
Figure 9F:

The usage and the operation of the electro-static floating type gyro device of the Example 1 will be explained referring to the figures. FIG. 9A shows a detailed diagram of the control output circuit. FIGS. 9B, 9C and 9D shows signal waveform examples.

A pair of electrodes 31, 41 is taken as a representative example among six pairs of the ring rotor type electro-static support electrodes. The application condition of the control voltages will be described in detail (See FIG. 9(a) for reference). The voltage V1 is also divided into a pair of the voltage V1a and the voltage V1b. The voltage V1a is applied to the support electrode and the voltage V1b is applied to the adjacent support electrode 31b. Positive and negative voltages of these complementary voltages V1a, V1b are permutated regularly or irregularly by the switch circuit 61 in accordance with the inversion control signal B. The control voltage V12 is also divided into a pair of voltages V12a and V12b, where the voltage V12a is applied to the support electrode 41a and the voltage V12b is applied to the support electrode 41b. Positive and negative voltages of these complementary voltages V12a, V12b are permutated regularly or irregularly by a switch circuit 71 in accordance with the inversion control signal B.

By supposing that a constant offset voltage which is applied to the electro-static support electrodes 31, 41 is Vof when the gyro rotor 10 is at a standstill in a neutral position, apart from the rotation along the Axis Z, the Axis X control voltage component calculated for controlling posture and changing is Vx, and points in time of inverting the inversion control signal B are t0 and t1, the main component of the voltage V1a is both a negative −Vof−Vx and a positive +Vpf−Vx with alternate permutation at the inversion points in time t0 and t11 (See FIG. 9B for reference). The main component of the voltage V1b is both a positive +Vof−Vx and a negative −Vpf−Vx with alternate permutation at the inversion points in time t0 and t1. Further, the main component of the voltage V12a is both a negative −Vof+Vx and a positive +Vpf−Vx with alternate permutation at the inversion points in time t0 and t1. The main component of the voltage V12b is both a positive +Vof−Vx and a negative −Vpf+Vx with alternate permutation at the inversion points in time t0 and t1.

Further, in the control voltages V1, V12, the displacement detection signal is superimposed. That is (See FIG. 9C for reference), a displacement detection signal of triangle waveform voltage generated by the displacement detection signal generation circuit 81, which in turn superimposes to the control voltages V1, V12 through the displacement detection electrodes 38, 48 and the electro-static support electrodes 31, 41 sequentially. The amplification of the displacement detection signal V0 can exceed a power supply voltage Vcc of the control output circuit 54 as far as including a voltage step-up circuit to the displacement detection signal generation circuit 81. On the other hand (See FIG. 9B for reference), a voltage component superimposed to the control voltages V1, V12 is extremely small so that the waveforms of the applied voltages V1a, V1b, V12a, V12b are almost same as the waveform of the main component.

On the other hand, the displacement detection current i0 (See FIG. 9C for reference) together with displacement detection voltage V0 is transmitted to the output line of the control output circuit 54 through displacement detection electrodes 38, 48, the gyro rotor 10, the electro-static support electrodes 31, 41, and the switch circuits 61, 71 sequentially. The displacement detection current i0 is divided based on capacity of a plurality of electrodes 31 to 48, and the electrodes are respectively detected in the transmitted destination as detection current signals for detecting displacement i1 to displacement detection current i12 by the current detection circuits 84 of the concerned parts. These current signals (See the displacement detection current i1 in FIG. 9E for reference) show a clear current value corresponding to the division without being affected by insertion of the switch circuits 61, 71, which becomes a square wave of the frequency corresponding to the one of the clock CLKa.

Then (See FIG. 9F and FIG. 8A for reference), the current signals (i0 to i12) or similar signals are quantized by the A/D converter circuit 53a, at a timing synchronized with the clock CLKa but whose phase is deviated. A well-known calculation for controlling posture is performed by the digital processor 53b. Further, angular velocity and acceleration for an inertia space are calculated. Thus, also in the case, a posture control, an acceleration detection and such are conducted accordingly. Further, the displacement detection current r1 to r6 are binarized and taken in to the DSP, and then a well-known calculation for rotation driving is performed by the DSP. The upper limit of basic frequency of the control voltage for driving rotation is about several hundreds of Hz. The basic frequency of the displacement detection current r1 to r6 is high as previously described so that the both are accurately discriminated. Thus, the rotor rotation driving is conducted accordingly.

As apparent from the above-mentioned description, in the electro-static floating type gyro device of the Example 1, it is possible to amplify the applied voltage signals for detecting displacement V0 depending on the situation. Further, the control voltages V1 to V12 may be also amplified to near power supply voltage Vcc of the control output circuit 54 so that a sufficient signal level may be found even if capacity of the plurality of electrodes 31 to 48 are small with miniaturization of gyro mechanism unit. Thus, not only detection of the displacement may be accomplished accordingly, but also the posture control performance is improved. Further, complementary permutation of the voltage applied to the adjacent pair of the support electrodes is performed. As a consequence, ion distribution state in an inner surface of an electrically insulative gyro case is stabilized and also a measurement discrepancy by an area difference of the adjacent pair of the electro-static support electrodes is reduced. Therefore the measurement accuracy is improved.

EXAMPLE 2

Figure 10A:
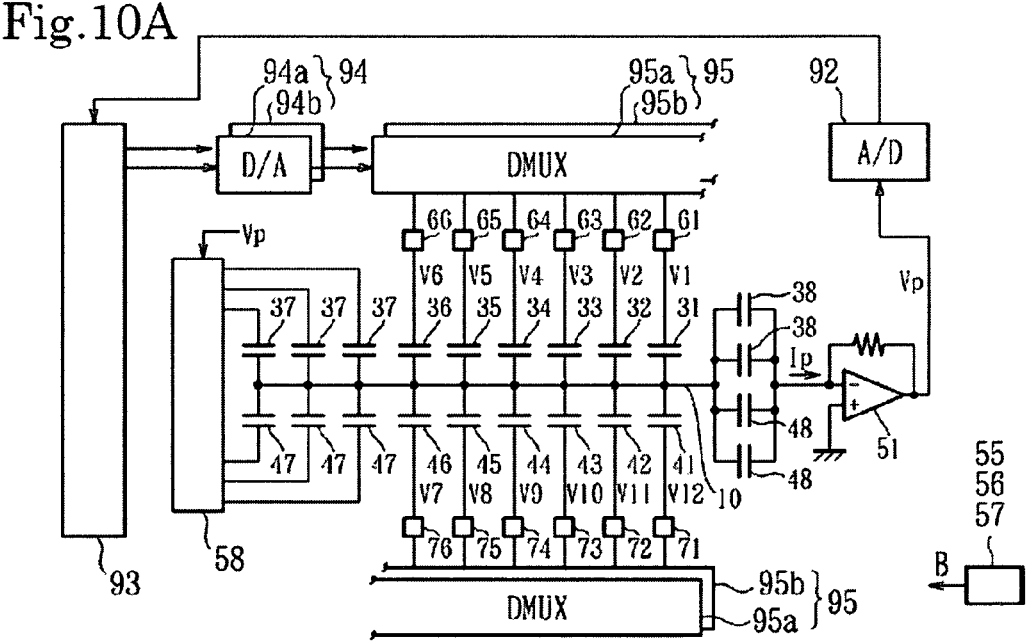
Figure 10B:
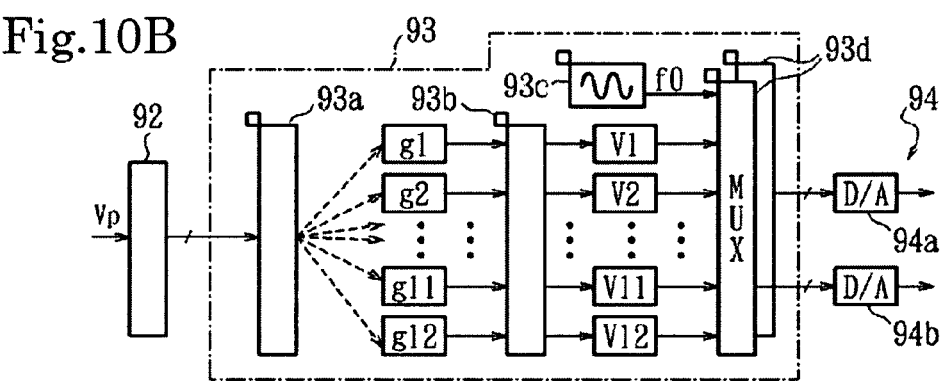
Figure 10C:
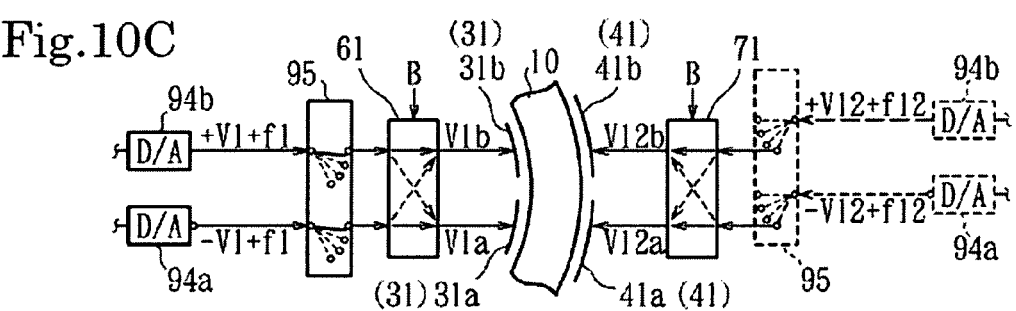

The detailed configuration of the Example 2 of the electro-static floating type gyro device of the present invention will be described by referring to the figures. FIG. 10 shows a structure of the electronic circuit unit. FIG. 10A shows an entire circuit diagram including a control circuit and a signal detection circuit. FIG. 10B shows an inner block diagram of the control circuit and the signal detection circuit. FIG. 10C shows a connection diagram of the control output circuit.

The difference between the electro-static floating type gyro device of the Example 2 and the one of the Example 1 is that the displacement detection signal generation circuit 52 of the signal detection circuit, a signal input circuit of the posture control circuit 53 and the control output circuit 54 are embodied in a time division circuit (See FIG. 10A for reference), and many of them are embodied with a DSP 93 (Digital Signal Processor) which is a programmable digital circuit (See FIG. 10B for reference).

The improvement of the control circuit is made only within the posture control circuit 53 not made to the rotor control circuit 58. The complementary voltage permutation circuit 55/61 to 76 for permeating the complementary voltages applied to adjacent pairs of electro-static support electrodes are provided as well. However, the displacement detection signal detects the detection current Ip from the displacement detection electrodes 38, 48 by the previously described displacement detection signal detection circuit 51. That is to say, in the displacement detection method, the displacement detection signal is flowed into the displacement detection electrodes from the electro-static support electrodes and the displacement detection signal is detected using a time division (See Japanese Patent Laid Open No. 2005-214948 for reference).

In the Example 2, the gyro mechanism unit 10/20 is the same as above. The electronic circuit unit will be described. In the electronic circuit unit (See FIGS. 10A and 10B for reference), there are an A/D converter circuit 92 (analog-digital converter circuit) receiving a displacement detection signal Vp obtained by detecting the detection current Ip in the displacement detection signal detection circuit 51, a DSP 93 (a shared digital circuit) installed with processing programs such as a distribution input unit 93a and displacement (and others) calculation unit 93b, a D/A converter circuit 94 with a negative D/A converter 94a and a positive D/A converter 94b, and a switch circuit 95 (DMUX) provided with a negative converter circuit 95a with 1-input and 12-output and a positive converter circuit 95b with 1-input and 12-output.

A displacement detection signal f0 with a high frequency not affecting the movement of the gyro rotor 10 is used. Time division is done to the f0 and converted into a large number of signals for detecting displacement f1 to f12. Therefore, the frequencies of oscillation waveform portions of the signals for detecting displacement f1 to f12 are all the same. The displacement detection signal f1 is superimposed on the V1 and applied to the support electrode 31. The other signals for detecting displacement f1 to f12 are also superimposed on the posture control voltages V2 to V12 and applied to the electro-static support electrodes 32 to 36, 41 to 46, whose detection is performed in the current detection circuit 51 from the displacement detection electrodes 38, 48.

In detail, (See FIGS. 10A and 10B for reference), the A/D converter circuit 92 sends the displacement detection signal Vp to, for example, the DSP 93 for converting the signal into digital values of 8-bit and 12-bit with a cycle of 250 ns (frequency 4 MHz). In the illustrated example, it is configured with one general purpose high speed A/D converter. The processing capacity and the cost should be balanced. A large number of the A/D converters may be disposed in parallel to enhance the processing capacity. It may be also possible that a low cost small number of the A/D converters and an additional converter circuit may be combined and embodied for reduction in cost. In any configuration, a conversion period of the A/D converter circuit 92 is short enough to make the frequency, the reciprocal number, is higher than tens of kHz in order not to affect the movement of the gyro rotor 10.

In the DSP 93 (See FIG. 10B for reference), a distribution input unit 93a, an displacement calculation unit 93b, a sine curve generation unit 93c and a selection unit 93d are either embodied in the program and installed. Also in the DSP 93, a partial area of memory is assigned to store and maintain detection signal input values g1 to g12 and posture control voltages V1 to V12 as digital values. These digital values are updated and referred at any time by the above-described programs 93a, 93b, 93c, 93d. In addition, the posture control voltages V1 to V12 are respectively stored and maintained in a pair of the positive and negative ones (±V1 to ±V12). The detection signal input values g1 to g12 is stored and maintained with a signal level of the displacement detection signal Vp (amplification value). In addition, the posture control voltages V1 to V12 handled by the DSP 93 are the ones before conducting permutation of the complementary voltages by the switch circuits 61 to 66, 71 to 76, therefore, the positive and negative voltages are clearly discriminated.

The distribution input unit 93a operates as follows. The digital value is input from the A/D converter circuit 92 and is set to be a g1 when the selection unit 93d selects the displacement detection signal f0 in the input destination and when the switch circuit 95 selects the support electrode 31. The digital value is input from the A/D converter circuit 92 and is set to be a g2 when the selection unit 93d selects the displacement detection signal f0 to the input destination and when the switch circuit 95 selects the support electrodes 32 to the input destination. The digital value is input from the A/D converter circuit 92 and set to be a corresponding value among displacement detection signals g3 to g6 when the selection unit 93d selects the displacement detection signal f0 to the input destination and when the switch circuit 95 selects either of the electro-static support electrodes 33 to 36 to the input destination. The digital value is input from the A/D converter circuit 92 and set to be a corresponding value among the detection signal input values g7 to g12 when the selection unit 93d selects the displacement detection signal f0 to the input destination and when the switch circuit 95 selects either of the electro-static support electrodes 41 to 46 to the output destination.

The displacement calculation unit 93b calculates a relative displacements ΔX, ΔY, ΔZ, Δϕ and Δθ with a well-known expression from the detection signal input value g1 to g12, in which capacity of the electro-static support electrodes 31 to 36, 41 to 46 is reflected every time, supposing that each of the detection signal input values g1 to g12. are identical to the displacement detection signal Vp at the time of applying f0 for the electro-static support electrodes 31 to 36, 41 to 46. In order to make the displacements zero, a well-known calculation is performed (Detailed description of the operation content is omitted because it may be same as conventional one) and thus the posture control voltages V1 to V12 before permutation are calculated, and then the digital values are updated in corresponding areas.

The sine curve generation unit 93c generates signal with a frequency which is much higher than tens of kHz which may affect to the movement of the gyro rotor 10, for example, of a sine curve of several MHz and tens of MHz. A well-known calculation of trigonometric function may be repeated. A series of polygonal line approximation, in which several points to tens of points per cycle has been calculated in advance and stored, may be read out concurrently. In any event, it is so set that the generated sine curve is sent out to the selection unit 93d as a f0.

The selection unit 93d has two of selection means with 13 input/1 outputs (MUX). Either of the selection means repeats a selection process at a frequency which is higher than tens of kHz which may affect to the movement of the gyro rotor 10 but lower than the displacement detection signal f0, for example, frequency of several hundreds of kHz and 1 MHz. Each of the cycles of the selection process is divided into 12 equal portions of cycles, and each of the equal portion period is divided into an earlier period occupying most of an entire cycle and a later period occupying remaining one of the entire cycle.

In one selection means, in the earlier period of the twelve equal portions of periods, the f0 is selected in any time of the twelve equal portions of periods, and in the later period, positive voltages +V1 to +V12 are selected sequentially corresponding to a positioning within the twelve equal portions of periods, which are sent out to the positive D/A converter 94b. In addition, the other selection means also selects the f0 at any time of the twelve equal portions of periods in the earlier period, however, in the later period, in the case of the other selection means, negative voltage −V1 to −V12 among the posture control voltages V1 to V12 are selected sequentially corresponding to positioning within the twelve equal portions of periods, which are sent out to the negative D/A converter 94a.

The negative D/A converter 94a and the positive D/A converter 94b of the 94 (See FIGS. 10A to 10C for reference) convert digital values of for example 8-bit and 12-bit sent from the selection unit 93d into analog signals at high speed. The converters whose conversion cycles are shorter than the time width of the polygonal line approximation of the f0 are used. For instance, such converters repeat conversions in cycles of 25 ns (frequency 40 MHz).

The positive converter circuit 95b of the switch circuit 95 receives an output of the negative D/A converter 94a and switches the output destination recurrently corresponding to the twelve equal portions of periods by the selection means of the selection unit 93d. In the twelve equal portions in times, in which the selection unit 93d selects f0 at the earlier period and selects the V1 at the later period, the analog signal (−Vi+f1) is input from the negative D/A converter 94a and then the negative voltages are sent out to one input of the switch circuit 61. Also in the twelve equal portions of periods, in which the selection unit 93d selects the f0 at the earlier period and selects the V12 at the later period, the analog signal (−V12+f12) is input from the negative D/A converter 94a and the negative voltages are sent out to one input of the switch circuit 71.

The positive converter circuit 95b of the 95 receives an output of the positive D/A converter 94b and switches the output destination recurrently corresponding to the twelve equal portions of periods by the selection means of the selection unit 93d. In the twelve equal portions of periods, in which the selection unit 93d selects the f0 at the earlier period and selects the V1 at the later period, the analog signal (+V1+f1) is input from the negative D/A converter 94a and then the positive voltages are sent out to the other input of the switch circuit 61. Also in the twelve equal portions of periods, in which the selection unit 93d selects the f0 at the earlier period and selects the V12 at the later period, the analog signal (+V12+f12) is input from the positive D/A converter 94b and the positive voltages are sent out to one input of the switch circuit 71.

The switch circuits 61, 71 switch correspondence of the inputs and the outputs in response to the inversion control signal B. Therefore, the voltage V1a supplied to the support electrode 31a can be a negative analog voltage (−V1+f1) and a positive analog voltage (+V1+f1) alternately, and the voltage V1b supplied to the support electrode 31b can be a positive analog voltage (+V1+f1) and a negative analog voltage (−V1+f1) alternately. The voltage V12a at the support electrode 41a can be a negative analog voltage (−V12+f12) and a positive analog voltage (+V12+f12) alternately. The voltage V12b at the support electrode 41b can be a positive analog voltage (+V12+f12) and a negative analog voltage (−V12+f12) alternately.

The negative converter circuit 95a and the positive converter circuit 95b also input the analog signal from the 94 in the twelve equal portions of periods, in which the selection unit 93d selects the f0 at the earlier period and selects the posture control voltages V2 to V11 at the later period, the analog signal (+V12+V12) is input from the 94, divides the signal into inputs of the switch circuits 62 to 66, 72 to 76 and sent out. The switch circuits 62 to 66, 72 to 76 switch a correspondence of the inputs and outputs corresponding to the inversion control signal B. The applied voltages V2 to V11 are permutated with respect to the adjacent pairs when applied to the electro-static support electrodes 32 to 36, 42 to 46. Thus, analog voltages with the positive and negative will alternate.

The displacement detection signal f1 is an intermittent oscillation signal, in which a part of the f0 is sliced out, and is applied to the support electrode which is an application destination of the complementary posture control voltages V1. similar, the displacement detection voltages f2 to f12 are also intermittent oscillation signals, in which a part of the f0 is sliced out, and are applied to the electro-static support electrodes which are an application destination of the posture control voltages. V2 to V12.

The usage and the operation of the electro-static floating type gyro device of the Example 2 will be described by referring to the figures. FIGS. 11A, 11B and 11C and FIGS. 12A, 12B, 12C, 12D, 12E, 12F and 12G are signal waveform examples. For a purpose of distinction, application states of the posture control voltages V1, V12 and displacement detection signals f1, f12 for electrode pairs 31, 41 among six pairs of the ring rotor type electro-static support electrodes will be mainly described in detail.

Figure 11A:
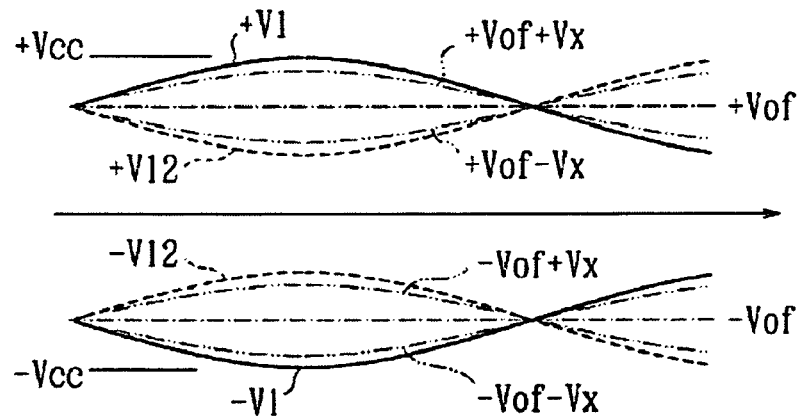
FIGS. 11A to 11C are signal waveform examples.
Figure 11B:
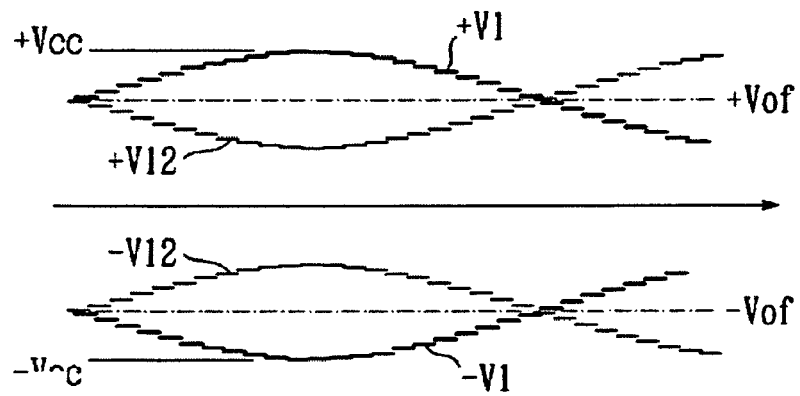

In this case, time division by the selection unit 93d and the switch circuit 95 and permutation of the complementary voltage by the switch circuits 61 to 66, 71 to 76, the posture control voltages V1 to V12 are disregarded (See FIG. 11). The main component is can be a positive voltage and a negative voltage because the positive and negative are apparently separated before permutation. The positive voltages +V1 to +V12 and the negative voltage −V1 to −V12 also follow the conventional waveform as for a basic part of the waveform (See waveforms with dotted-dash lines in FIG. 11A). However, as for the oscillation, the power supply voltage Vcc is used at the maximum and expanded toward (See waveforms with solid lines in FIG. 11A) regardless of the displacement detection signals f1 to f12.

By reflecting the time division by the selection unit 93d and the switch circuit 95, the posture control voltages V1 to V12 will become waveforms of a step shape. To be specific (See FIG. 11B), ether the positive voltages +V1 to +V12 and the negative voltages −V1 to −V12 change discontinuously and drastically every cycle of the selection processes by the selection unit 93d (for example, with a reciprocal number of frequency of several hundreds of kHz or MHz.).

Further, by reflecting the displacement detection signals f1 to f12 generated by time division from the f0 (See FIG. 11C), either the positive voltages +V1+fi, +V12+f12, or the negative voltages −V1+f1 to −V12+f12 will be waveforms with sine curves embedded with a large oscillation in a step-shaped component. These sine curves are embedded simultaneously in a positive and negative pair +V1, −V1 to +V12, −V12 with the same manner. However, among the reciprocal posture control voltages V1 to V12, periods are deviated for every 1/12 of the period of the selection process by the selection unit 93d.

Figure 11C:
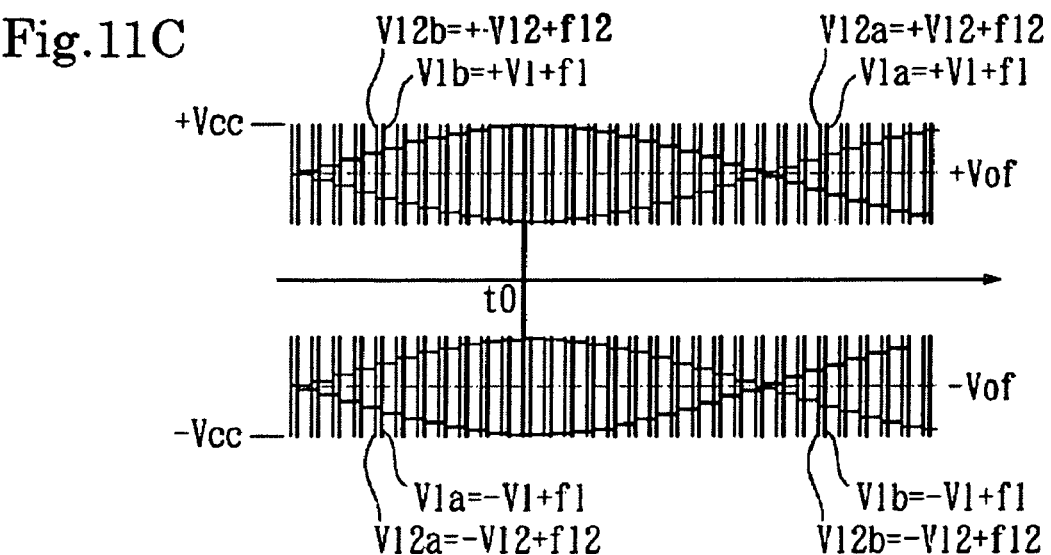

When reflecting permutation of the complementary voltage by the switch circuits 61, 71 (See a time t0 in FIG. 11(c).), the voltage V1a at the support electrode 31a can be a negative voltage −V1+f1 and a positive voltage +V1+f1 alternately, the voltage at the support electrode 31a can be a negative voltage −V1+f1 and a positive voltage +V1+f1 alternately. The voltage V1b at the support electrode can be a positive voltage +V1+f1 and a negative voltage −V1+f1 alternately. The voltage V12a at the support electrode 41a can be a negative voltage −V12+f12 and a positive voltage −V12+f12 alternately. The voltage at the electrode V12b for supporting electro-static 41b can be a negative voltage +V12+f12 and a positive voltage −V12+f12 alternately. It is similar for the other electro-static support electrodes 32 to 36, 42 to 46. As for either of adjacent pairs, permutation of complementary voltage is performed without deteriorating the electro-static attraction operation by the complementary voltage with positive and negative voltages and without deteriorating the displacement detection signal.

In addition, the reason an embedding timing of displacement detection signals f1 to f12 is deviated every 1/12 of the period of the selection processes by the selection unit 93d among the reciprocal posture control voltages V1 to V12 is that outputs of the positive voltage +V1 to +V12 and a negative voltage −V1 to −V12 are suppressed as for the displacement detection signals f1 to f12 among the electro-static support electrodes 31 to 36, 41 to 46 by a time division on the occasion of an application of posture control voltages V1 to V12, and outputs of the positive voltage +V1 to +V12 and a negative voltage −V1 to −V12 is performed after the end of application of the displacement detection signals f1 to f12, outputs of the positive voltage +V1 to +V12 and the negative voltage −V1 to −V12 following to the application of the displacement detection signals f1 to f12 are switched with a time division of the application destination of the displacement detection signals f1 to f12.

The time division is further described in detail referring to waveform diagrams with expanded time axes (See FIG. 12 for reference). The displacement detection signal f0 which is a sequence of sine curve or the similar waveform (See FIG. 12A) is divided separately by almost every 1 cycle, and a divided cycle is firstly assigned to the displacement detection signal f1 and its oscillation portion is made (See FIG. 12A). Next it is assigned to the displacement detection signal f2 and its oscillation portion is made (See FIG. 12C). Further it is assigned to the displacement detection signal f3 and its oscillation portion is made (See FIG. 12D). similar oscillation portions of the displacement detection signals f4 to f11 are made (not shown in the figure) sequentially. Then they are assigned to the displacement detection signal f12 and its oscillation portion is made (See FIG. 12E). These become a one round unit, and they are repeated, and displacement detection signals f1 to f12 are generated, where the oscillation frequency is equal but the oscillation portions is not overlapped, and each of them is applied to the electro-static support electrodes 31 to 36, 41 to 46.

Figure 12A:
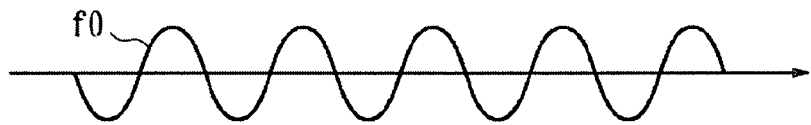
FIGS. 12A to 12G are signal waveform examples.
Figure 12B:
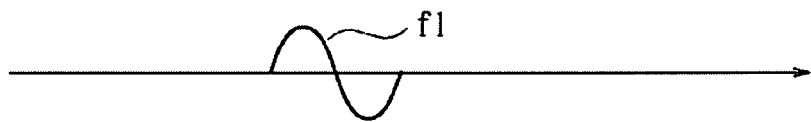
Figure 12C:
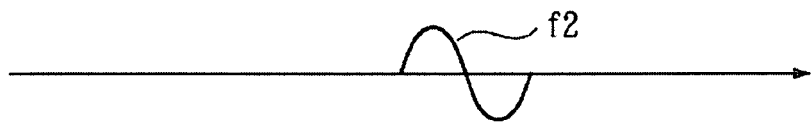
Figure 12D:
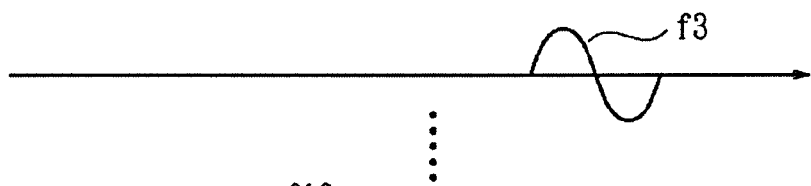
Figure 12E:
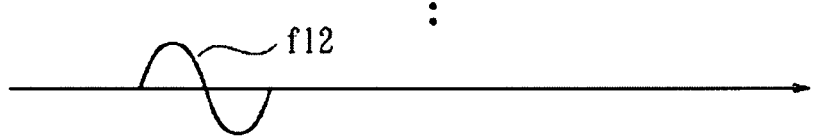
Figure 12F:
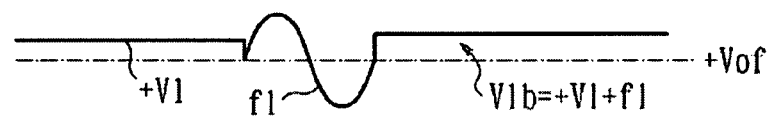
Figure 12G:
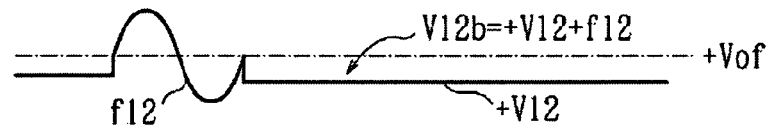

When the oscillation portion is applied to the support electrode 31, i.e., an adjacent pair of electrodes for supporting electro-static 31a, 31b, right after that, the voltage V1a for example a negative voltage −V is applied to the support electrode 31a, and the voltage V1b for example a positive voltage −V is applied to the support electrode 31b (See FIG. 12F for reference). The time is deviated for every one cycle of the displacement detection signal f0. similar, the oscillation portions of the displacement detection voltages f2 to f11 are applied to the adjacent pairs of the electro-static support electrodes 32 to 36, 42 to 46 in the same manner. Right after that, the posture control voltages V2 to V11 are applied to the adjacent pairs of the electro-static support electrodes 32 to 36, 42 to 46 with the reverse aspects (not shown in the figures). Then further, the oscillation portion of displacement detection signal f12 is applied to the adjacent pairs of support electrode 41, i.e., the adjacent pair of the electro-static support electrodes 41a, 41b. Right after that, the voltage V12a for example, the negative voltage −V12, is applied to the support electrodes 41a, and the voltage V12b, for example the positive voltage +V12, is applied to the support electrodes 41b (See FIG. 12G for reference).

The application of the posture control voltages V1 to V12 (±V1 to ±V12) either occurs for an instant. The electro-static support electrodes 31 to 36, 41 to 46 and the gyro rotor 10 are electrically equivalent to capacitors. Therefore, if the current driving capability of the control output circuit portion is sufficient, voltages at the electro-static support electrodes 31 to 36, 41 to 46 become the level of the posture control voltages V1 to V12 immediately. The voltages have short round cycles of time division (i.e., cycles of a one round selection process by the selection unit 93d, for example a frequency of several hundreds of kHz or 1 MHz as previously described). Therefore, changes by electric discharge rarely occur and kept at almost constant until the next application of the displacement detection signals f1 to f12.

Thus, while voltages of the electro-static support electrodes 31 to 36, 41 to 46 are of waveform shapes which are voltage signals of plural steps, a sine curve with a large oscillation is embedded in the step portion. In broad perspective, the waveforms, in which the displacement detection signals f1 to f12 are superimposed on the posture control voltages V1 to V12, however, in microscopic perspective, the superimposition disappears and the power supply voltage Vcc may be utilized utmost for either of the complementary posture control voltages and the displacement detection signal.

The displacement detection signals f1 to f12 have the oscillation portions reaching to the power supply voltage Vcc. The posture control voltages V1 to V12 have moderate opposite control values not exceeding the power supply voltage Vcc. Therefore, either the displacement detection signals f1 to f12 and the posture control voltages V1 to V12 are more enhanced than the conventional ones. With the displacement detection signals f1 to f12 being reinforced, sufficient current is found in the detection current Ip. Therefore, the displacement detection signal Vp becomes a clear one with little noise. In addition, the displacement detection signals f1 to f12 are not affected by a control and movement of the gyro rotor 10 irrelevant to any oscillation, because the displacement detection signals f1 to f12 applied to the adjacent electrodes.

Also, a time rate for application and maintenance of the posture control voltages V1 to V12 is slightly reduced (1/12 in the example) so that it is concerned that the control capacity be deteriorated. However, the control capacity will not be deteriorated because strengthening of the voltage oscillation is supplemented. Further, either of the time divisions is performed in a short cycle where nothing is affected to the movement of the gyro rotor 10. Thus, the gyro rotor 10 moves smoothly as before.

Other Remarks

The application of the present invention is not limited to the electro-static floating type gyro devices shown in the above-described Examples (Japanese Patent Laid Open No. 2004-191296 and Japanese Patent Laid Open No. 2005-214948). The present invention may also be applied to the other electro-static floating type gyro devices (Japanese Patent Laid Open No. H08-320231, Japanese Patent Laid Open No. 2001-235329, Japanese Patent Laid Open No. 2005-140708). In the above-described Embodiments and Examples, either of the two electrostatic support electrodes receives positive and negative voltages when permutation of the complementary voltages are expanded to two electrodes other than one adjacent pair, however, it is not obligatory to make any ones of two arbitrary electrodes are supplied with permutated voltages. For example, the electro-static support electrodes 31 to 36, 41 to 46 may be divided into electro-static support electrodes 31, 41 arranged on Axis X for taking care of electro-static direction in the X direction, electro-static support electrodes 32, 42 arranged on Axis Y for taking care of electro-static direction in the Y direction and electro-static support electrodes 33 to 36, 43 to 46 not being arranged on the X and Y surface for taking care of electro-static direction in the Z direction. The same polarity inversion control signals may be assigned to the electro-static support electrodes 31, 41 on the Axis X and the electro-static support electrodes 32, 42 on the Axis Y in which there is nowhere being adjacent to each other. It may be so arranged that there will be a case that the positive and negative ones are applied to the arbitrary two electrodes between the same polarity inversion control signals described above and the electro-static support electrodes 33 to 36, 43 to 46 for taking care of electro-static direction in the Z direction.

Additionally, for example, the electro-static support electrodes 31 to 36, 41 to 46 may be divided into the electro-static support electrodes 31, 41 arranged on the Axis X, electro-static support electrodes 32, 42 arranged on the Axis Y, electro-static support electrodes 33, 35, 43, 45 arranged on the XZ surface and electro-static support electrodes 34, 36, 44, 46 arranged on the YZ surface. Then, the same polarity inversion control signals may be assigned to a group of electrodes, in which nowhere being adjacent to each other. In addition, for example, the electro-static support electrodes 31, 41 arranged on the Axis X may be subdivided to an electrode located on the positive and an electrode located on the negative, the electro-static support electrodes 32, 42 arranged on the Axis Y may also be subdivided to an electrode located on the positive and an electrode located on the negative, the electro-static support electrodes 33, 43, 35, 45 arranged on the XZ surface may also be subdivided to electrodes located on the positive for the X direction 33, 43 and electrodes located on the negative for the X direction 35, 45, the electro-static support electrodes 34, 44, 36, 46 arranged on the YZ surface may also be subdivided to electrodes located on the positive for the Y direction and electrodes located on the negative for the Y direction. The same polarity inversion control signal s may be assigned to the group of electrodes, in which there is nowhere being adjacent to each other.

In the above-described Examples, the DSP 53b for posture control circuit 53 and the DSP for rotor control circuit 58 may be provided separately. They may be combined in a single DSP or a single MPU, in which the both programs are installed. In addition, the distribution input unit 93a of the DSP 93, the displacement calculation unit and others 93b, sine curve generation unit 93c and the selection unit 93d are not always limited to the embodiment by the programs described above, but may be embodied in a system LSI or other hardwired logics. Storages of the detection signal input values g1 to g12 and the control voltages V1 to V12 may be done not only in a memory but also in latches. Further, A/D converter circuit 92 and the distribution input unit 93a in the DSP 93 may be a part of posture control circuit, or may or may not belong to the posture control circuit, or is made in a part of the signal detection circuit or an interface unit belonging to the both.

What is claimed is:

1. An electro-static floating type gyro device for suppressing movement of ions inside the electro-static floating type gyro device, the electro-static floating type gyro device comprising:
    a gyro mechanism having a gyro rotor and plural pairs of adjacent electro static support electrodes for supporting said gyro rotor;
    a posture control circuit for generating complementary posture control voltages for controlling a posture of the gyro rotor, wherein the complementary posture control voltages applied to the pairs of adjacent electro static support electrodes are alternated in a constant cycle or an irregular cycle, and wherein the movement of the ions inside the electro-static floating type gyro device is suppressed by the application of the complementary posture control voltages to the pairs of adjacent electro static support electrodes.

2. The electro-static floating type gyro device according to claim 1 further comprising:
    a switch circuit for altering the complementary posture control voltages applied to pairs of adjacent electro static support electrodes.

3. The electro-static floating type gyro device according to claim 2 further comprising:
    an inversion control signal generation circuit for generating an inversion control signal, the inversion control signal being supplied to the switch circuit to alter an application of the complementary posture control voltages to the pairs of adjacent electro static support electrodes.

4. The electro-static floating type gyro device according to claim 1 further comprising:

a switch circuit having a first and a second inputs and a first and a second outputs, the first and the second inputs receiving the complementary posture control voltages respectively, the first and the second outputs being connected to each of the pairs of adjacent electro static support electrodes, the switch circuit connecting the first input to the first output and the second input to the second output in a first mode, and connecting the first input to the second output and the second input to the first output in a second mode, the first mode and the second mode being alternated.

5. The electro-static floating type gyro device according to claim 4 further comprising:
an inversion control signal generation circuit for generating an inversion control signal, the inversion control signal being supplied to select modes from the first mode and the second mode.

6. The electro-static floating type gyro device according to claim 1 wherein:
the complementary posture control voltages applied to the pairs of adjacent electro static support electrodes are alternated in accordance with plural frequency divided clock signals.

7. The electro-static floating type gyro device according to claim 1 further comprising:
switch circuits for altering the complementary posture control voltages applied to the pairs of adjacent electro static support electrodes; and
an inversion control signal generation circuit for generating an inversion control signal, the inversion control signal being supplied to the switch circuit to alter an application of the complementary posture control voltages to the pairs of adjacent electro static support electrodes, wherein:
said inversion control signal generation circuit includes:
a clock generation circuit for generating a clock signal; and
frequency division circuits for generating plural frequency divided clock signals, each of the plural frequency divided clock signals supplied to different one of the switch circuits for altering the complementary posture control voltages applied to the pairs of adjacent electro static support electrodes.

8. The electro-static floating type gyro device according to claim 1 wherein:
the complementary posture control voltages applied to the pairs of adjacent electro static support electrodes are alternated in accordance with random noise control signals.

9. The electro-static floating type gyro device according to claim 1 further comprising:
switch circuits for altering the complementary posture control voltages applied to the pairs of adjacent electro static support electrodes; and
an inversion control signal generation circuit for generating an inversion control signal, the inversion control signal being supplied to the switch circuit to alter an application of the complementary posture control voltages to the pairs of adjacent electro static support electrodes, wherein:
said inversion control signal generation circuit includes a ROM storing random noise pattern for generating plural random noise control signals supplied to different one of the switch circuits for altering the complementary posture control voltages applied to the pairs of adjacent electro static support electrodes.

10. An electro-static floating type gyro device for suppressing movement of ions inside the electro-static floating type gyro device, the electro-static floating type gyro device comprising:
a gyro rotor;
a gyro case storing the gyro rotor, the gyro case having plural pairs of adjacent electro static support electrodes for supporting said gyro rotor and plural displacement detection electrodes between the gyro rotor and the gyro case, the electro static support electrodes and the detection electrodes being arranged on inside surfaces of the gyro case;
a signal detection circuit for detecting a relative displacement of the gyro rotor and the gyro case through the detection electrodes and for generating a displacement detection signal; and
a posture control circuit for generating complementary posture control voltages for controlling a posture of the gyro rotor based on the displacement detection signal and for applying the complementary posture control voltages to the pairs of adjacent electro static support electrodes; wherein
the complementary posture control voltages applied to the pairs of adjacent electro static support electrodes are alternated in a constant cycle or an irregular cycle, and wherein the movement of the ions inside the electro-static floating type gyro device is suppressed by, the application of the complementary posture control voltages to the pairs of adjacent electro static support electrodes.

11. The electro-static floating type gyro device according to claim 10 further comprising:
a switch circuit for altering the complementary posture control voltages applied to the pairs of adjacent electro static support electrodes.

12. The electro-static floating type gyro device according to claim 11 further comprising:
an inversion control signal generation circuit for generating an inversion control signal, the inversion control signal being supplied to the switch circuit to alter an application of the complementary posture control voltages to the pairs of adjacent electro static support electrodes.

13. The electro-static floating type gyro device according to claim 10 further comprising:
a switch circuit having a first and a second inputs and a first and a second outputs, the first and the second inputs receiving the complementary posture control voltages respectively, the first and the second outputs being connected to each of the pairs of adjacent electro static support electrodes, the switch circuit connecting the first input to the first output and the second input to the second output in a first mode, and connecting the first input to the second output and the second input to the first output in a second mode, the first mode and the second mode being alternated.

14. The electro-static floating type gyro device according to claim 13 further comprising:
an inversion control signal generation circuit for generating an inversion control signal, the inversion control signal being supplied to select modes from the first mode and the second mode.

15. The electro-static floating type gyro device according to claim 10 wherein:

the complementary posture control voltages applied to the pairs of adjacent electro static support electrodes are alternated in accordance with plural frequency divided clock signals.

16. The electro-static floating type gyro device according to claim 10 further comprising:
switch circuits for altering the complementary posture control voltages applied to the pairs of adjacent electro static support electrodes; and
an inversion control signal generation circuit for generating an inversion control signal, the inversion control signal being supplied to the switch circuit to alter an application of the complementary posture control voltages to the pairs of adjacent electro static support electrodes, wherein:
said inversion control signal generation circuit includes:
a clock generation circuit for generating a clock signal; and
frequency division circuits for generating plural frequency divided clock signals, each of the plural frequency divided clock signals supplied to different one of the switch circuits for altering the complementary posture control voltages applied to the pairs of adjacent electro static support electrodes.

17. The electro-static floating type gyro device according to claim 10 wherein:
the complementary posture control voltages applied to the pairs of adjacent electro static support electrodes are alternated in accordance with random noise control signals.

18. The electro-static floating type gyro device according to claim 10 further comprising:
switch circuits for altering the complementary posture control voltages applied to the pairs of adjacent electro static support electrodes; and
an inversion control signal generation circuit for generating an inversion control signal, the inversion control signal being supplied to the switch circuit to alter an application of the complementary posture control voltages to the pairs of adjacent electro static support electrodes, wherein:
said inversion control signal generation circuit includes a ROM storing random noise pattern for generating plural random noise control signals supplied to different one of the switch circuits for altering the complementary posture control voltages applied to the pairs of adjacent electro static support electrodes.

19. A method for controlling an electro-static floating type gyro device and for suppressing movement of ions inside the electro-static floating type gyro device, the method comprising:
applying positive and negative voltages for controlling a posture of a gyro rotor to a pair of first and second adjacent electro static support electrodes for supporting said gyro rotor respectively; and
applying negative and positive voltages for controlling the posture of the gyro rotor to the pair of first and second adjacent electro static support electrodes for supporting said gyro rotor respectively, wherein:
said applying positive and negative voltages and said applying negative and positive voltages are repeated in a constant cycle or an irregular cycle, and wherein the movement of the ions inside the electro-static floating type gyro device is suppressed by said applying positive and negative voltages and said applying negative and positive voltages to the pair of first and second adjacent electro static support electrodes.

* * * * *